US008595311B2

(12) United States Patent
Asano

(10) Patent No.: US 8,595,311 B2
(45) Date of Patent: Nov. 26, 2013

(54) NETWORK SYSTEM, INFORMATION PROCESSING APPARATUS, AND COMPUTER PRODUCT

(75) Inventor: Yasushi Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 152 days.

(21) Appl. No.: 12/492,934

(22) Filed: Jun. 26, 2009

(65) Prior Publication Data

US 2010/0064022 A1 Mar. 11, 2010

(30) Foreign Application Priority Data

Sep. 9, 2008 (JP) ................................. 2008-231531

(51) Int. Cl.
*G06F 15/16* (2006.01)
(52) U.S. Cl.
USPC ............ 709/208; 370/240; 370/242; 702/108
(58) Field of Classification Search
USPC .......... 370/277, 350, 345, 230, 242; 710/107, 710/52; 714/38.11, 739; 702/108
See application file for complete search history.

(56) References Cited

U.S. PATENT DOCUMENTS

| 5,335,227 | A | | 8/1994 | Smith et al. | |
|---|---|---|---|---|---|
| 5,371,897 | A | | 12/1994 | Brown et al. | |
| 5,768,543 | A | * | 6/1998 | Hiles ............................ | 710/107 |
| 6,279,124 | B1 | * | 8/2001 | Brouwer et al. ............ | 714/38.11 |
| 6,665,268 | B1 | * | 12/2003 | Sato et al. ...................... | 370/242 |
| 7,240,268 | B2 | * | 7/2007 | Wrigley et al. ............... | 714/739 |
| 7,450,557 | B2 | * | 11/2008 | Kang et al. .................... | 370/345 |
| 7,778,171 | B2 | * | 8/2010 | Bedrosian ..................... | 370/230 |
| 7,782,803 | B2 | * | 8/2010 | Al-Harthi ..................... | 370/277 |
| 2004/0243334 | A1 | * | 12/2004 | Wrigley et al. ............... | 702/108 |
| 2006/0251046 | A1 | * | 11/2006 | Fujiwara ....................... | 370/350 |
| 2008/0228966 | A1 | * | 9/2008 | Kehne et al. .................... | 710/52 |

FOREIGN PATENT DOCUMENTS

| JP | 5-300163 A | 11/1993 |
|---|---|---|
| JP | 8-137781 A | 5/1996 |
| JP | 09-062531 | 3/1997 |
| JP | 11-232236 | 8/1999 |
| JP | 2000-069119 A | 3/2000 |
| JP | 2001-075833 | 3/2001 |
| JP | 2002-152206 | 5/2002 |
| JP | 2006-65523 | 3/2006 |
| JP | 2007-036397 A | 2/2007 |

OTHER PUBLICATIONS

Japanese Office Action mailed by JPO and corresponding to Japanese application No. 2008-231531 on Apr. 2, 2013, with Partial English Translation.

* cited by examiner

*Primary Examiner* — Dustin Nguyen
(74) *Attorney, Agent, or Firm* — Fujitsu Limited Center

(57) ABSTRACT

A network system includes a data transfer device that transfers data and a plurality of information processing apparatuses connected to the data transfer device. The information processing apparatuses include a master information processing apparatus and a slave information processing apparatus. The master information processing apparatus includes a controlling unit and a transmitting unit. The controlling unit controls the order and timing in and at which the information processing apparatuses including the master information processing apparatus transmit data to each of the information processing apparatuses. The transmitting unit transmits the data to each of the information processing apparatuses in the order and at the timing controlled by the controlling unit. The slave information processing apparatus includes a transmitting unit that transmits the data to each of the information processing apparatuses in the order and at the timing controlled by the controlling unit.

13 Claims, 17 Drawing Sheets

FIG.3

| TRANSMITTER | TRANSMISSION DESTINATION |
|---|---|
| 0 | 0 |
| 1 | 1 |
| 2 | 2 |
| 3 | 3 |

FIG.4

| TRANSMITTER | TRANSMISSION DESTINATION |
|---|---|
| 0 | 0 |
| 1 | 1 |
| 2 | 2 |
| 3 | 3 |

| TRANSMITTER | TRANSMISSION DESTINATION |
|---|---|
| 0 | 0 |
| 1 | 1 |
| 2 | 2 |
| 3 | 3 |

| TRANSMITTER | TRANSMISSION DESTINATION |
|---|---|
| 0 | 0 |
| 1 | 1 |
| 2 | 2 |
| 3 | 3 |

| TRANSMITTER | TRANSMISSION DESTINATION |
|---|---|
| 0 | 0 |
| 1 | 1 |
| 2 | 2 |
| 3 | 3 |

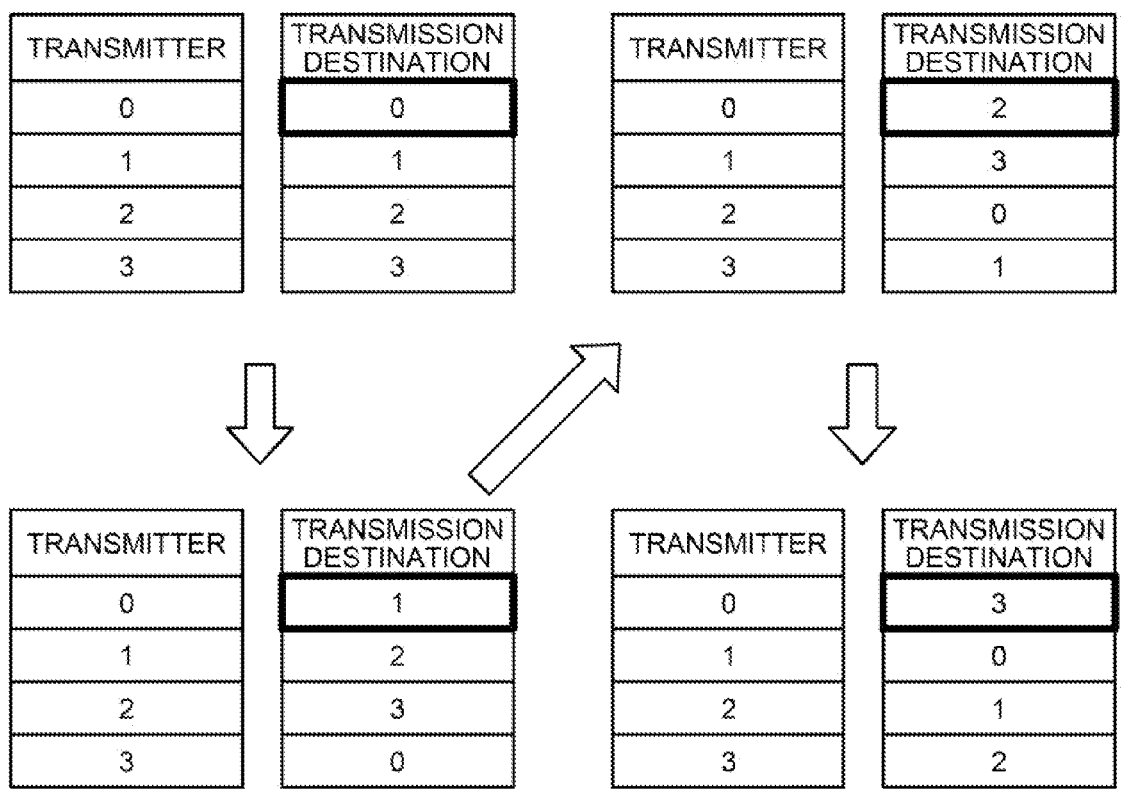

NETWORK SYSTEM, INFORMATION PROCESSING APPARATUS, AND COMPUTER PRODUCT

CROSS-REFERENCE TO RELATED APPLICATION

This application is based upon and claims the benefit of priority of the prior Japanese Patent Application No. 2008-231531, filed on Sep. 9, 2008, the entire contents of which are incorporated herein by reference.

FIELD

The embodiment discussed herein is directed to a network system including a plurality of information processing apparatuses connected to a data transfer device, an information processing apparatus, and a computer product.

BACKGROUND

In a conventional computation system as a system that configures a supercomputer, a plurality of housings in which, for example, 128 central processing units (CPUs) and shared memories are mounted are connected to a cross-bar switch.

In a network system in which a plurality of processing units that perform information processing is connected by a switching unit that transfers data among nodes as in the computation system, it is important to perform tests or management before starting operation or during operation so that the system operates appropriately. Japanese Laid-open Patent Publication No. 2000-69119 discloses a technology utilized in test and management of the network system for this purpose.

In one of such technologies, a test of a transfer path of a network system and a stress test of a transfer switching unit are performed by making each node execute a computer program, and transferring data from a node to another node.

However, the conventional technology has a problem that a test cannot be performed by making each node execute a single computer program. In other words, each node transmits data based on combinations of transmitters and transmission destinations prepared in a computer program. Because the combinations are different for each node, if four nodes are provided in a system for example, four different computer programs need to be created for the nodes, and it takes labor to create such programs.

SUMMARY

According to an aspect of an embodiment, a network system includes a data transfer device that transfers data and a plurality of information processing apparatuses connected to the data transfer device. The information processing apparatuses include a master information processing apparatus and a slave information processing apparatus. The master information processing apparatus includes a controlling unit and a transmitting unit. The controlling unit controls the order and timing in and at which the information processing apparatuses including the master information processing apparatus transmit data to each of the information processing apparatuses. The transmitting unit transmits the data to each of the information processing apparatuses in the order and at the timing controlled by the controlling unit. The slave information processing apparatus includes a transmitting unit that transmits the data to each of the information processing apparatuses in the order and at the timing controlled by the controlling unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an example of a table created by a master node;
FIG. 4 is an example of tables for explaining selection of identification information of transmission destinations;
FIG. 18 is an example of a table created by a master node;
FIG. 19 is an example of tables for explaining selection of identification information of transmission destinations of the all-path communication test.

DESCRIPTION OF EMBODIMENTS

Exemplary embodiments of the invention will be explained with reference to the accompanying drawings.

Figure 1:
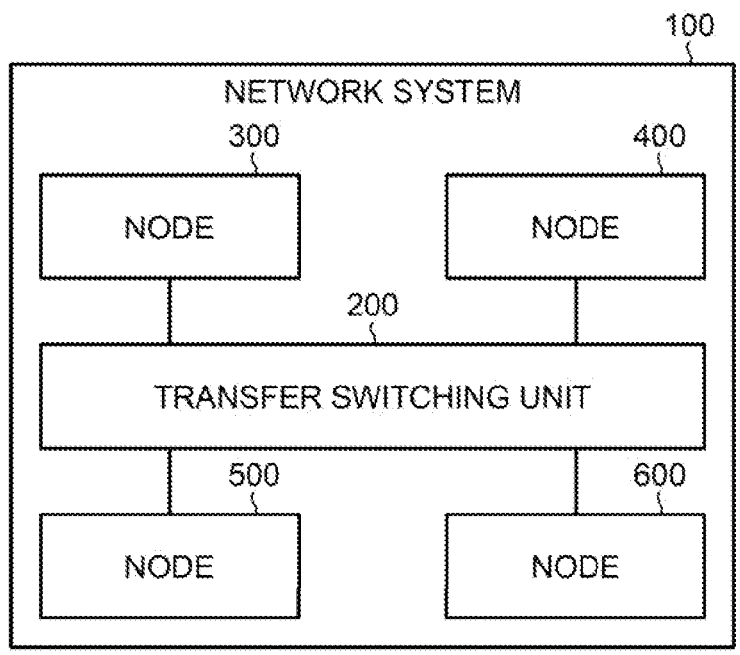
FIG. 1 is a configuration of a network system according to an embodiment of the present invention.

FIG. 1 illustrates a configuration of a network system according to the embodiment. As illustrated in FIG. 1, a network system 100 includes a transfer switching unit 200, and four nodes 300 to 600 connected to the transfer switching unit 200. The number of nodes connected to the transfer switching unit 200 only has to be more than one. The transfer switching unit 200 may be, for example, a crossbar switch or a router that receives data transmitted from nodes, and transfers the data to a specified transmission destination. The nodes 300 to 600 process information. The node operates as a calculation node including a plurality of CPUs or shared memories when the transfer switching unit 200 is a crossbar switch. The node operates as a server device when the transfer switching unit 200 is a router.

In the embodiment, the node 300 is a master node, and the other nodes 400 to 600 are slave nodes when a test on a transfer path of the network system 100 or a stress test of the transfer switching unit 200 is performed. The node 300 as the master node controls the order and the timing of transmission of data from each of the nodes 300 to 600 to all the nodes. Specifically, the node 300 acquires identification information of each node, and creates combinations of transmission sources (transmitters) and transmission destinations based on the acquired identification information. The node 300 stores the created combinations therein, transmits the combinations to the nodes 400 to 600 as the slave nodes, and instructs the nodes 400 to 600 how to select identification information as a transmission destination in the combinations. Each node selects identification information as a transmission destination in the combinations given by the node 300 in the order instructed by the node 300, and transmits data to the nodes identified by the selected identification information. In this way, it becomes unnecessary to store a path list for deciding a transmission destination in each node as fixed data, and becomes possible to perform a test of a system by making each node execute a single computer program. Even when a node is added to or removed from the network system 100, the node 300 only has to reacquire identification information of each node, and thus it is not required to recreate four different path lists for the nodes.

Figure 2:
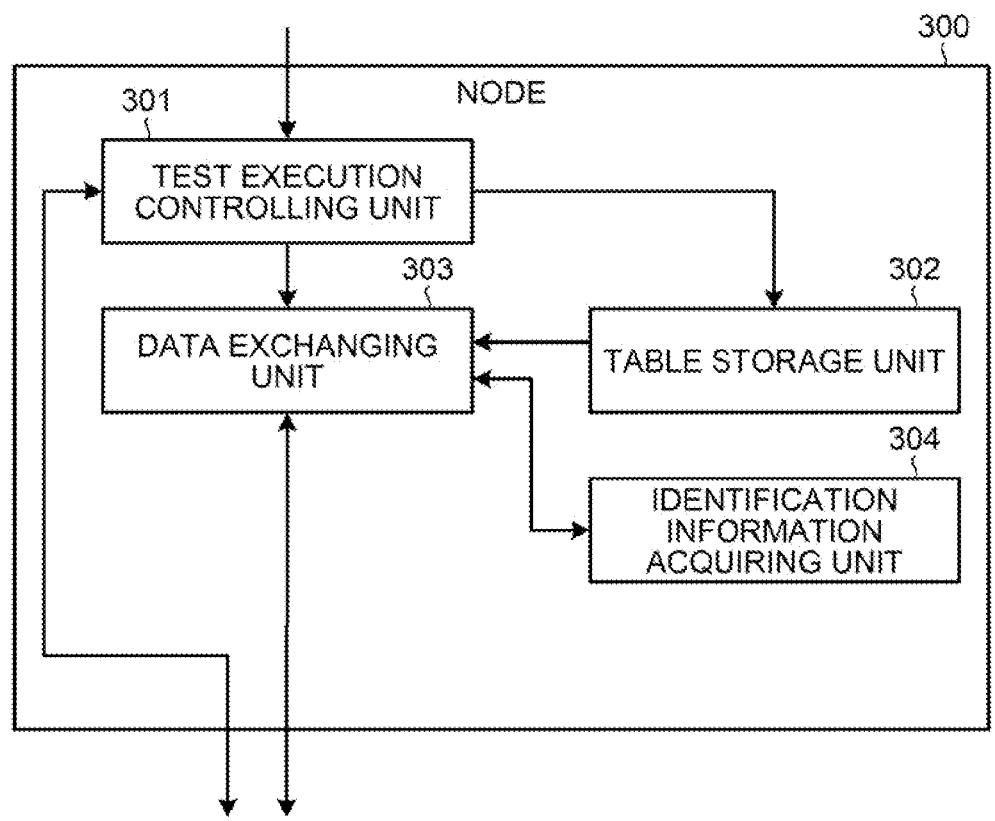
FIG. 2 is an example block diagram of a node.

The configuration of the node 300 as the master node is explained. FIG. 2 is a block diagram of the configuration of the node 300. As illustrated in FIG. 2, the node 300 includes a test execution controlling unit 301, a table storage unit 302, a data exchanging unit 303, and an identification information acquiring unit 304.

The test execution controlling unit 301 creates a table for controlling the order of transmission of data from each of the nodes 300 to 600 to all the nodes, transmits the created table to each node, and controls the timing of transmission of the data from each node. Specifically, the test execution controlling unit 301 receives a command from a host computer (not illustrated) that manages a system or the like, and discriminates the type of a test based on the command. There are four types of tests, all-path communication, all-port communication, random transfer, and one-port concentration. In the all-path communication test, each node transmits data in synchronization with transmission of data to another node without overlapping transmission destinations. In the all-port communication test, each node transmits data out of synchronization by selecting a node as a transmission destination in a predetermined order. In the random transfer test, each node transmits data out of synchronization by selecting a node as transmission destination arbitrarily. In the one-port concentration test, each node transmits data in synchronization with transmission of data intensively to one node.

The test execution controlling unit 301 having discriminated the type of a test acquires identification information of the nodes 300 to 600 connected to the transfer switching unit 200, that is, identification information including that of itself, sets each piece of the acquired identification information as a transmitter and as a transmission destination, and creates a table in which a transmitter and a transmission destination are arbitrarily combined with each other.

A specific example is given below. As illustrated in FIG. 3, the test execution controlling unit 301 acquires identification information "0" of the node 300, identification information "1" of the node 400, identification information "2" of the node 500, and identification information "3" of the node 600. Then, the test execution controlling unit 301 creates a table for example by combining the identification information "0" as a transmitter and the identification information "0" as a transmission destination. The test execution controlling unit 301 also combines the identification information "1" of the node 400 as a transmitter and the identification information "1" of the node 400 as a transmission destination. Furthermore, the test execution controlling unit 301 ranks transmission destinations in the table. For example, in the table illustrated in FIG. 3, the test execution controlling unit 301 ranks the identification information "0" as the first transmission destination, the identification information "1" as the second transmission destination, the identification information "2" as the third transmission destination, and the identification information "3" as the fourth transmission destination. The test execution controlling unit 301 may create a table in which start addresses and transfer sizes are associated further with combinations of the transmitters and the transmission destination.

Then, after creating the table, the test execution controlling unit 301 stores the table in the table storage unit 302, and transmits the created table to the slave nodes. In the embodiment, all the nodes in a system use the same table created by the nodes 300 as the master node at the time of data transfer.

After transmitting the table, the test execution controlling unit 301 transmits a different control packet corresponding to each type of a test to the slave nodes, and notifies the data exchanging unit 303 of the type of the test. The control packets includes a packet that specifies all-path communication, a packet that specifies all-port communication, a packet that specifies random transfer, and a packet that specifies one-port concentration, depending on the type of the test.

After transmitting the control packet, the test execution controlling unit 301 receives a control packet indicating that the test type has been recognized from each slave node whatever type of control packet is transmitted. At this time, the test execution controlling unit 301 secures on a memory a synchronization control table (not illustrated) for confirming whether a control packet indicating that the test type has been recognized is received for each node, and confirms whether control packets have been received from all the nodes. In addition to the synchronization control table, the test execution controlling unit 301 secures on a memory an exclusive control table for setting a seed value storage area for random generation, and a data transfer end code storage area as a test control table for controlling a test. The seed value storage area for random generation is an area for storing seed values necessary for the data exchanging unit 303 described later to acquire random values at the time of executing a test of random transfer. The data transfer end code storage area is an area for managing whether reception of data transferred from the transfer switching unit 200 has completed.

Having received control packets indicating that the test type has been recognized from all the slave nodes, the test execution controlling unit 301 transmits control packets for instructing start of data transfer to each slave node, and instructs the data exchanging unit 303 to start data transfer. In this way, the test execution controlling unit 301 controls nodes to start data transfer in synchronization with each other.

When the type of the test is all-path communication or one-port concentration, the test execution controlling unit 301 instructs each node to start data transfer every time the transmission destination changes. In other words, because a slave node that has received a control packet specifying all-path communication, or a control packet specifying one-port concentration returns to the master node a control packet indicating that data transfer preparation has been completed after data transmission to a node, the test execution controlling unit 301 confirms whether control packets have been received from all the nodes using the synchronization control table or not. After receiving control packets indicating that data transfer preparation has been completed from all the slave nodes, the test execution controlling unit 301 instructs each node to start next data transfer. In this way, the test execution controlling unit 301 controls nodes to transfer data in synchronization with each other every time the transmission destination changes. On the other hand, when not having received control packets indicating that data transfer preparation has been completed from all the slave nodes within a predetermined length of time, the test execution controlling unit 301 suspends an instruction to start next data transfer, and ends the test.

The table storage unit 302 receives the table illustrated in FIG. 3 from the test execution controlling unit 301 and stores the table therein.

The data exchanging unit 303 transmits data in the order and at the timing controlled by test execution controlling unit 301. As regards data transmission, the data exchanging unit 303 secures a data transfer area for test execution on a memory, sets a part of the secured data transfer area as a transmission data area, and stores test data therein. The data exchanging unit 303 initializes a part of the data transfer area secured on a memory as a data receiving area to receive test data transmitted from the other node during test execution. In the following, operations of the data exchanging unit 303 are explained according to the types of tests in the order of all-path communication, all-port communication, one-port concentration, and random transfer.

The all-path communication test is explained. When the data exchanging unit 303 instructed to start data transfer by the test execution controlling unit 301, the data exchanging unit 303 instructs the identification information acquiring unit 304 to acquire identification information of the data exchanging unit 303 and receives identification information of the data exchanging unit 303. Then, as illustrated in FIG. 4, the data exchanging unit 303 refers to the table stored in the table storage unit 302 and, upon receiving the identification information "0", for example, selects a transmission destination associated with the identification information "0" as a transmitter, that is the identification information "0". Then, the data exchanging unit 303 transmits data to a node identified by the selected identification information "0". Because the identification information "0" is identification information of the node 300, that is, identification information of itself, the data is sent back to the node 300. When start addresses and transfer sizes are associated with the combinations of transmitters and transmission destinations, the data exchanging unit 303 reads out data to be transmitted from a memory based on the start addresses and the transfer sizes associated with the identification information.

Then, upon being instructed to start next data transfer from the test execution controlling unit 301, the data exchanging unit 303 next selects the identification information "1" according to the ranking given to the identification information of transmission destinations in the table, and transmits data to a node identified by the selected identification information "1". As a result, the node 400 receives data. Thereafter, the data exchanging unit 303 similarly transmits data by setting the identification information "2" as a transmission destination according to the raking, or alternatively the identification information "3" as a transmission destination every time it is instructed by the test execution controlling unit 301 to start data transfer. As a result, the nodes 500 and 600 receive data. Because the other nodes also transfer data every time they are instructed to start data transfer similarly, the data transfer in the system is synchronized. The data exchanging unit 303 makes a node of a data transmission destination recognize completion of data reception by transmitting a dummy packet after transmitting test data. In other words, upon receiving the dummy packet, the test execution controlling unit 301, and a data exchanging unit 401 of the node 400 write the dummy packet in the data transfer end code storage area, and recognize completion of test data reception.

The all-port communication test is now explained. When instructed to start data transfer by the test execution controlling unit 301, the data exchanging unit 303 instructs the identification information acquiring unit 304 to acquire the identification information of the node 300, and receives the identification information of the node 300. Then, the data exchanging unit 303 refers to the table stored in the table storage unit 302, selects the identification information (transmission destination) associated with the identification information (transmitter) same as the identification information received from the identification information acquiring unit 304, and transmits data to a node identified with the selected identification information. The data exchanging unit 303 selects the next identification information according to the ranking given to the identification information set as the transmission destination in the table, and transmits data to a node identified by the selected identification information without being instructed to start next data transfer from the test execution controlling unit 301 unlike in the all-path communication. Accordingly, at the time of the all-port communication, nodes transfer data out of synchronization with each other. Thereafter, the data exchanging unit 303 selects the next identification information, and transmits data to a node identified by the selected identification information sequentially.

The one-port concentration test is explained. When instructed to start data transfer by the test execution controlling unit 301, the data exchanging unit 303 refers to the table stored in the table storage unit 302, and first selects the first identification information according to the ranking given to the identification information set as a transmission destination in the table. Then, the data exchanging unit 303 transmits data to a node identified by the selected identification information. As in the case of the all-path communication, the data exchanging unit 303 is instructed to start next data transfer by the test execution controlling unit 301, next selects the second identification information according to the ranking, and transmits data to a node identified by the selected identification information. Thereafter, the data exchanging unit 303 similarly selects the next identification information every time it is instructed to start data transfer, and transmits data to a node identified by the selected identification information sequentially. Because the other nodes also transfer data every time they are instructed to start data transfer similarly, data transfer is synchronized in the system. Because the table that each node has is common, and the order of the identification information of transmission destinations is also common, data transfer concentrated to a single node may be realized by selecting from the top identification information (transmission destination) in the table. As in the case of the all-path communication test, the data exchanging unit 303 makes a node of a transmission destination recognize completion of data reception by transmitting a dummy packet after transmission of test data. In other words, upon receiving the dummy packet, the test execution controlling unit 301 and the data exchanging unit 401 in the node 400 described later write the dummy packet in the data transfer end code storage area, and recognize the completion of reception of the test data.

The random transfer test is explained. When instructed to start data transfer by the test execution controlling unit 301, the data exchanging unit 303 refers to the table stored in the table storage unit 302, and arbitrarily selects the identification information set as a transmission destination in the table. Then, the data exchanging unit 303 transmits data to a node identified by the selected identification information. The data exchanging unit 303 arbitrarily selects the identification information (transmission destination) of the data transmission incompletion in the table without being instructed to start next data transfer by the test execution controlling unit 301 unlike in the all-path communication. Then, the data exchanging unit 303 transmits data to a node identified by the selected identification information. Because the other nodes also transfer data without being instructed to start data transfer similarly, nodes transfer data out of synchronization with each other. Thereafter, the data exchanging unit 303 arbitrarily selects the identification information (transmission destination) of next data transmission incompletion, and transmits data to a node identified by the selected identification information sequentially. Whether data transmission is incomplete may be determined by, for example, storing identification information set as transmission destinations in a memory, and selecting identification information not stored in the memory.

Figure 5:
FIG. 5 is an example of tables for explaining a random transfer.

In the case of the random transfer test, data may not be transmitted at once, but may be divided and transmitted at several times. For example, as illustrated in FIG. 5, when the data exchanging unit 303 transmits data divided into four pieces at four times to a node identified by the identification information "0" in the table stored in the table storage unit 302, four combinations of the identification information "0" of the transmitter and the identification information "0" of the transmission destination are generated, and a table is recreated by associating the size "¼" indicating the data amount transmitted at once with each combination. The number of times at which the pieces of data are transmitted may be arbitrarily decided for each combination in the table by, for example, receiving a seed value from the test execution controlling unit 301, and dividing the data into a plurality of pieces based on a random function. When instructed to start data transfer by the test execution controlling unit 301, the data exchanging unit 303 refers to the table stored in the table storage unit 302, and arbitrarily selects identification information (transmission destination). Then, the data exchanging unit 303 transmits a specified amount of data to a node identified by the selected identification information.

The data exchanging unit 303 receives data transferred from the transfer switching unit 200 to the node 300, and compares the actually received data with an expected value as the data that should be received normally. The expected value is stored for example in a predetermined area on a memory included in the node 300 while being divided in advance for each node to be a data transmitter. The timing at which the data exchanging unit 303 compares the received data with the expected value is different for each type of a test. In the all-path communication test, the data exchanging unit 303 compares the received data and the expected value every time it receives data transmitted from each of the nodes including the node 300. In the all-path communication test, because the order of correspondent nodes that receive the data can be judged by the table, the data exchanging unit 303 reads out the expected value as the subject of comparison with the currently received data, that is, the expected value corresponding to the correspondent node as a transmitter of the received data from a memory every time it receives data, and compares the received data with the expected value.

In the case of the one-port concentration test, the data exchanging unit 303 compares the received data with the expected value every time it receives data. In other words, because in the case of the one-port concentration also, as in the case of the all-path communication test, the order for the node 300 to receive data can be judged by the table, the data exchanging unit 303 reads out the expected value corresponding to a node functioning as a transmitter of the received data stored in a predetermined area on a memory at the time of receiving data, and compares the received data with the expected value.

In the case of the all-port communication test and the random transfer test, the data exchanging unit 303 compares all pieces of the data transmitted from each node, including the node 300, after completion of data reception from individual nodes. In other words, in the case of the all-port communication and the random transfer test, the data exchanging unit 303 reads out all the expected values stored in a predetermined area on a memory and compares the values with the received data after completing receiving data from all the nodes. Then, the data exchanging unit 303 stores the comparison result in a predetermined area in a memory. In this way, whether the test result is normal can be judged based on the comparison result stored in a predetermined area on a memory.

If the received data and the expected values are different as a result of comparison between the received data and the expected value, in the case of the all-path communication test or the one-port concentration test, the data exchanging unit 303 performs predetermined process of, for example, suspending the test. Alternatively, an error message may be displayed on a display unit. In the case of the all-port communication test or the random transfer test, the data exchanging unit 303 performs predetermined process of, for example, storing the comparison result according to the comparison between the received data and the expected values.

The identification information acquiring unit 304 acquires identification information of the node 300. Specifically, upon receiving an instruction to acquire identification information from the data exchanging unit 303, the identification information acquiring unit 304 for example acquires a port number of a communication port used in communication with the transfer switching unit 200, and outputs the number to the data exchanging unit 303.

Figure 6:
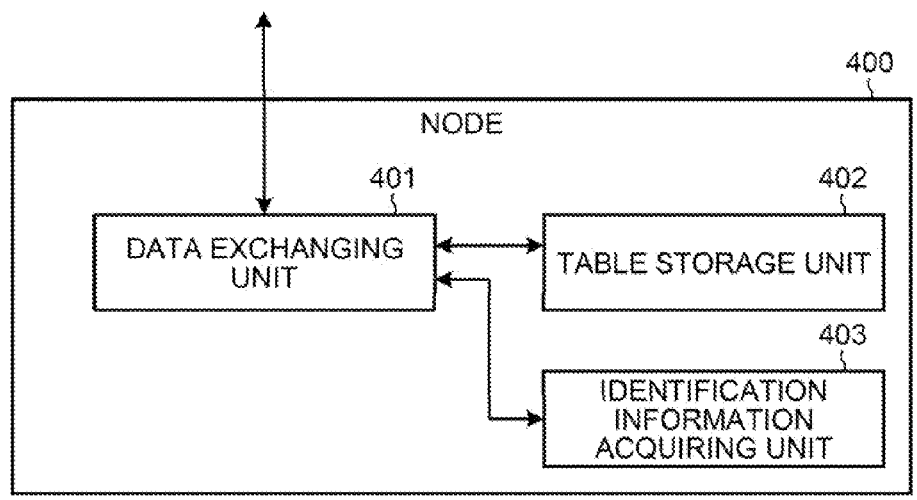
FIG. 6 is an example block diagram of a node.

The configuration of the nodes 400 to 600, which are slave nodes, is explained. FIG. 6 is a block diagram of the configuration of the node 400. As illustrated in FIG. 6, the node 400 includes the data exchanging unit 401, a table storage unit 402, and an identification information acquiring unit 403. The node 400 is explained as a representative of slave nodes, and other nodes 500 and 600 are not explained.

The data exchanging unit 401 transmits data in the order and at the timing that are controlled by the test execution controlling unit 301 of the node 300 as the master node. The data exchanging unit 401 receives the table illustrated in FIG. 3 from the node 300, and stores the received table in the table storage unit 402. Furthermore, the data exchanging unit 401 receives a control packet specifying the type of a test from the test execution controlling unit 301. Specific operation performed by the data exchanging unit 401 for each test specified by the control packet is explained below in the order of the all-path communication test, the all-port communication test, the one-port concentration test, and the random transfer test.

The case where the all-path communication test is specified is explained. When the all-path communication test is specified by the control packet received from the node 300, the data exchanging unit 401 transmits a control packet indicating that the test type has been recognized to the node 300 as the master node. Thereafter, the data exchanging unit 401 receives a control packet instructing transfer start from the node 300, thus instructs the identification information acquiring unit 403 to acquire identification information of the node 400 at the timing of receiving the control packet, and receives the identification information of the node 400 from the identification information acquiring unit 403. As illustrated in FIG. 4, the data exchanging unit 401 refers to the table stored in the table storage unit 402 and, for example, upon receiving the identification information "1", selects the transmission destination associated with the identification information "1" as the transmitter, that is, the identification information "1". Then, the data exchanging unit 401 transmits data to a node identified by the selected identification information "1". Because the identification information "1" is identification information of the node 400 as the subject node as described above, the data is sent back to the node 400 in this case.

In the case of the all-path communication test, the data exchanging unit 401 compares the received data and the expected values every time it receives data transmitted from each node including the node 400. After the comparison between the received data and the expected values, the data exchanging unit 401 transmits a control packet indicating the completion of data transfer preparation to the node 300. Thereafter, the data exchanging unit 401 receives a control packet instructing transfer start from the node 300, and thus selects next identification information according to the ranking given to the identification information set as the transmission destination in the table at the timing of receiving the control packet. For example, as explained above, after selecting the identification information "1" set as the transmission destination in the table illustrated in FIG. 4, the data exchanging unit 401 next selects identification information "2", and transmits data to a node identified by the selected identification information "2". Thereafter, the data exchanging unit 401 sequentially transmits data to a node identified by selected identification information as in the case of the identification information "1" and "2". By transmitting a dummy packet after transmitting test data, the data exchanging unit 401 makes a node of the transmission destination recognize completion of data reception.

In the operation performed by the data exchanging unit 401 when the all-port communication test is specified, the received data and the expected values are compared not every time data is received, but after data is received from all the nodes. The comparison result is stored in a predetermined area of a memory. In this way, it becomes possible to judge whether the test result is normal based on the comparison result stored in the predetermined area of the memory. Other operation is the same as that in the all-path communication test, and is not explained.

The case where the one-port concentration test is specified is explained. When the one-port concentration test is specified by a control packet received from the node 300, the data exchanging unit 401 transmits a control packet indicating that the test type has been recognized to the node 300 as the master node. Thereafter, the data exchanging unit 401 receives a control packet instructing transfer start from the node 300, thus refers to the table storage unit 402 at the timing of receiving the control packet, and selects the first identification information according to the ranking given to the identification information of the transmission destination set in the table. Then, the data exchanging unit 401 transmits data to a node identified by the selected identification information.

Because in the one-port concentration test, data from each node is transmitted intensively to one node, the data exchanging unit 401 compares the received data and the expected values only when it receives data from each node. After data transmission or data comparison, the data exchanging unit 401 transmits a control packet indicating the completion of data transfer preparation to the node 300. Thereafter, the data exchanging unit 401 receives a control packet instructing transfer start from the node 300, and thus selects the second identification information according to the ranking given to the identification information set as the transmission destination in the table. The data exchanging unit 401 transmits data to a node identified by the selected identification information. Afterwards, the data exchanging unit 401 selects identification information in the same way, and sequentially transmits data to a node identified by the selected identification information. As in the case of the all-path communication test, by transmitting a dummy packet after transmitting test data, the data exchanging unit 401 makes a node of the transmission destination recognize the completion of data reception.

The case where the random transfer test is specified is explained. When the random transfer test is specified by a control packet received from the node 300, the data exchanging unit 401 transmits a control packet indicating that the test type has been recognized to the node 300 as the master node. Thereafter, the data exchanging unit 401 receives a control packet instructing transfer start from the node 300, thus refers to the table storage unit 402 at the timing of receiving the control packet, arbitrarily selects identification information (transmission destination), and transmits data to a node identified by the selected identification information. Thereafter, the data exchanging unit 401 sequentially and arbitrarily selects identification information (transmission destination), and transmits data to a node identified by the selected identification information. After transmitting data by selecting all the identification information set as transmission destinations in the table, the data exchanging unit 401 compares the received data with the expected values. The data exchanging unit 401 stores the comparison result in a predetermined area of a memory. In this way, it becomes possible to judge whether the test result is normal based on the comparison result stored in the predetermined area of the memory.

The table storage unit 402 receives the table as illustrated in FIG. 3 from the data exchanging unit 401 and stores the table therein.

The identification information acquiring unit 403 acquires identification information of the node 400. Specifically, upon receiving an instruction to acquire identification information from the data exchanging unit 401, the identification information acquiring unit 403 for example acquires a port number of a communication port used in communication with the transfer switching unit 200, and outputs the port number to the data exchanging unit 401.

Figure 7:
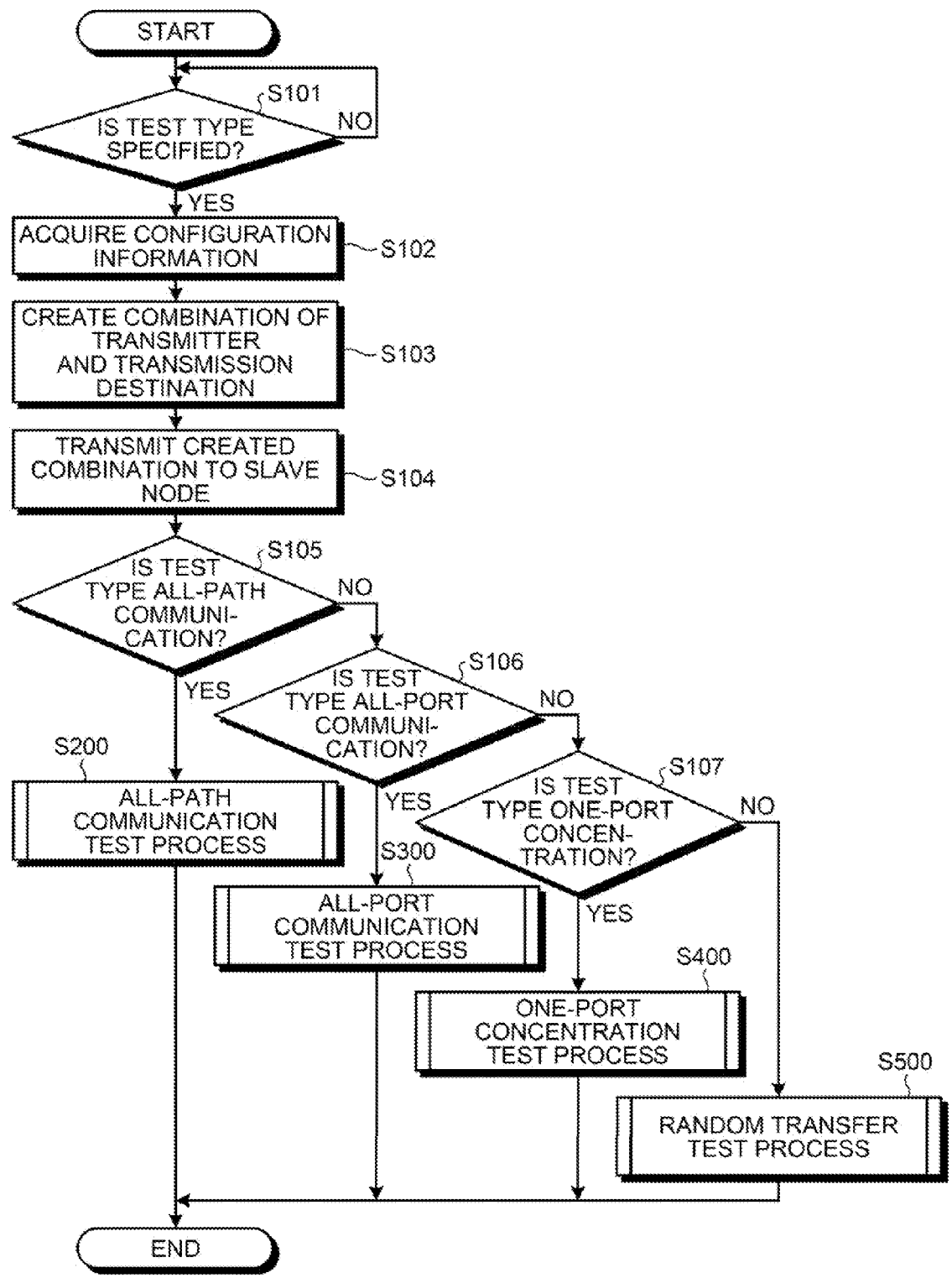
FIG. 7 is an example flowchart of the operation of the node.

A process flow performed by the node 300 as the master node is explained. FIG. 7 is a flowchart of the operation of the node 300. The process flow illustrated in FIG. 7 is executed repeatedly while the network system is active.

As illustrated in FIG. 7, when the node 300 is informed of the test type upon receiving a command from a host computer or the like, (YES at Step S101), the node 300 acquires configuration information of the network system 100 (Step S102), and creates a combination of a transmitter and a transmission destination (Step S103). Then, the node 300 transmits the created combination to the nodes 400 to 600 as the slave nodes (Step S104).

When the test type is the all-path communication (YES at Step S105), the node 300 performs an all-path communication test process (Step S200). When the test type is the all-port communication (NO at Step S105, and YES at Step S106), the node 300 performs an all-port communication test process (Step S300). When the test type is the one-port concentration, (NO at Step S105, NO at Step S106, and YES at Step S107), the node 300 performs a one-port concentration test process (Step S400). When the test type is the random transfer (NO at Step S105, NO at Step S106, and NO at Step S107), the node 300 performs a random transfer test process (Step S500). After the process of S200, S300, S400, or S500, the process of FIG. 7 ends.

Figure 8:
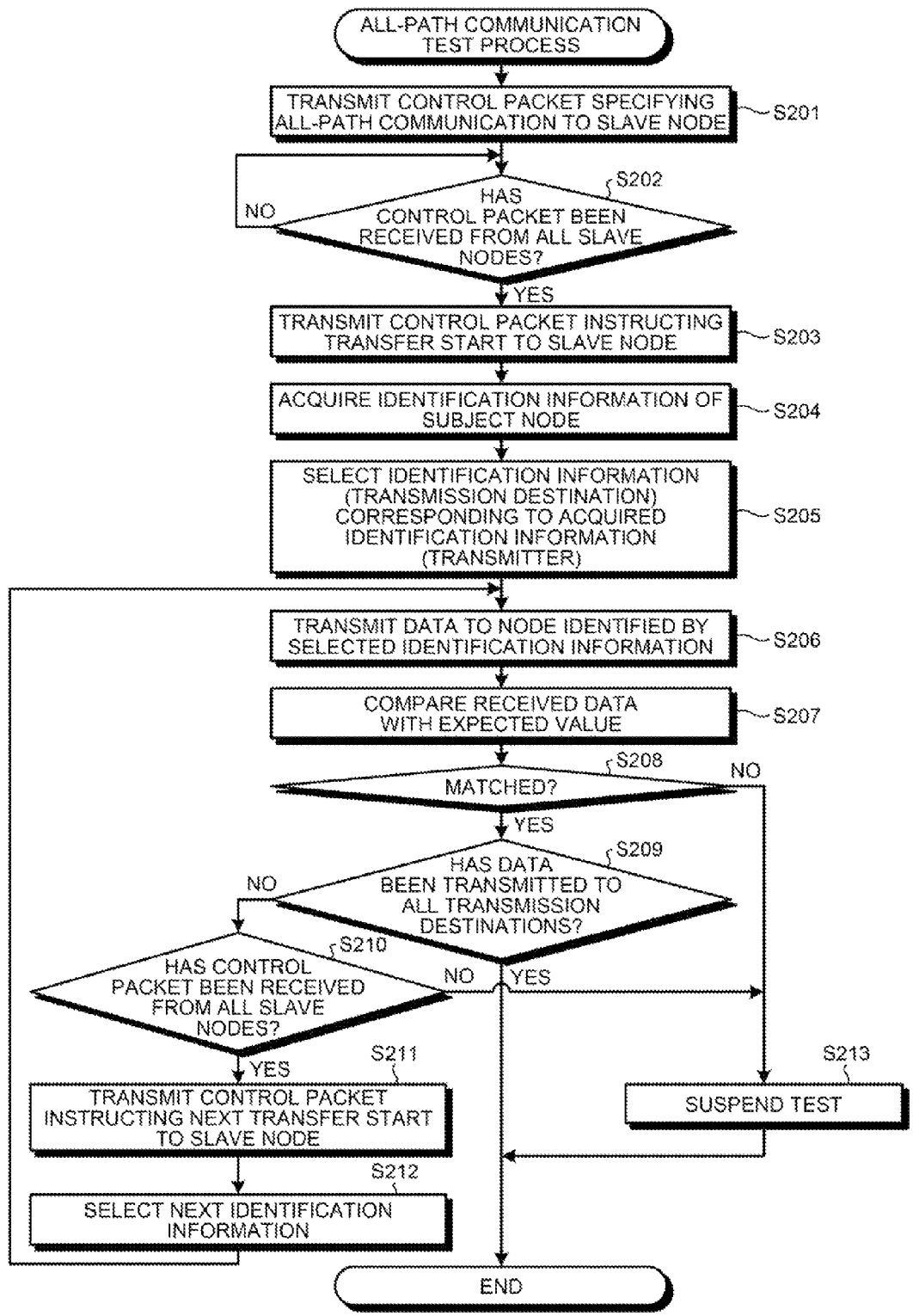
FIG. 8 is an example flowchart of an all-path communication test process performed by the node.

The all-path communication test process by the node 300 at Step S200 in FIG. 7 is explained with reference to FIG. 8. FIG. 8 is a flowchart of the all-path communication test process performed by the node 300.

As illustrated in FIG. 8, the test execution controlling unit 301 in the node 300 transmits a control packet specifying the all-path communication to the nodes 400 to 600 as the slave nodes (Step S201). Then, upon receiving a control packet indicating that the test type has been recognized from all of the nodes 400 to 600 (YES at Step S202), the test execution controlling unit 301 transmits a control packet instructing start of data transfer to the nodes 400 to 600 (Step S203).

Then, the data exchanging unit 303 acquires identification information of the node 300 by the identification information acquiring unit 304 (Step S204), selects identification information (transmission destination) corresponding to the acquired identification information (transmitter) in the table stored in the table storage unit 302 (Step S205), and transmits data to a node identified by the selected identification information (Step S206). Because in the all-path communication test, data is transferred from the transfer switching unit 200 to the node 300 after data transmission, the data exchanging unit 303 compares the data received from the transfer switching unit 200 with the expected values retained by the node 300 itself (Step S207). When the received data and the expected values do not match with each other as a result of the comparison (NO at Step S208), the data exchanging unit 303 suspends the test (Step S213), and the process ends.

On the other hand, when the received data and the expected values match with each other as a result of the comparison by the data exchanging unit 303 (YES at Step S208), and data is not transmitted to all the transmission destinations in the table yet (NO at Step S209), the test execution controlling unit 301 waits until it receives a control packet indicating the completion of data transfer preparation from all of the nodes 400 to 600 (Step S210). Then, upon receiving a control packet indicating the completion of data transfer preparation from all of the nodes 400 to 600 (YES at Step 210), the test execution controlling unit 301 transmits a control packet instructing next transfer start to the nodes 400 to 600 (Step S211). On the other hand, when not having received a control packet indicating the completion of data transfer preparation from all of the nodes 400 to 600 (NO at Step 210), the test execution controlling unit 301 suspends the test (Step S213), and the process ends.

After the test execution controlling unit 301 transmits a control packet instructing next transfer start, the data exchanging unit 303 selects next identification information according to the order given to identification information set as the transmission destination in the table (Step S212), and the process returns to Step S206.

The process from Step S206 to Step S212 is repeated until data is transmitted to all the transmission destinations in the table. After the data exchanging unit 303 transmits data to all the transmission destinations (YES at Step S209), the all-path communication process ends. The data is received in any appropriate way, and is not illustrated in FIG. 8.

Figure 9:
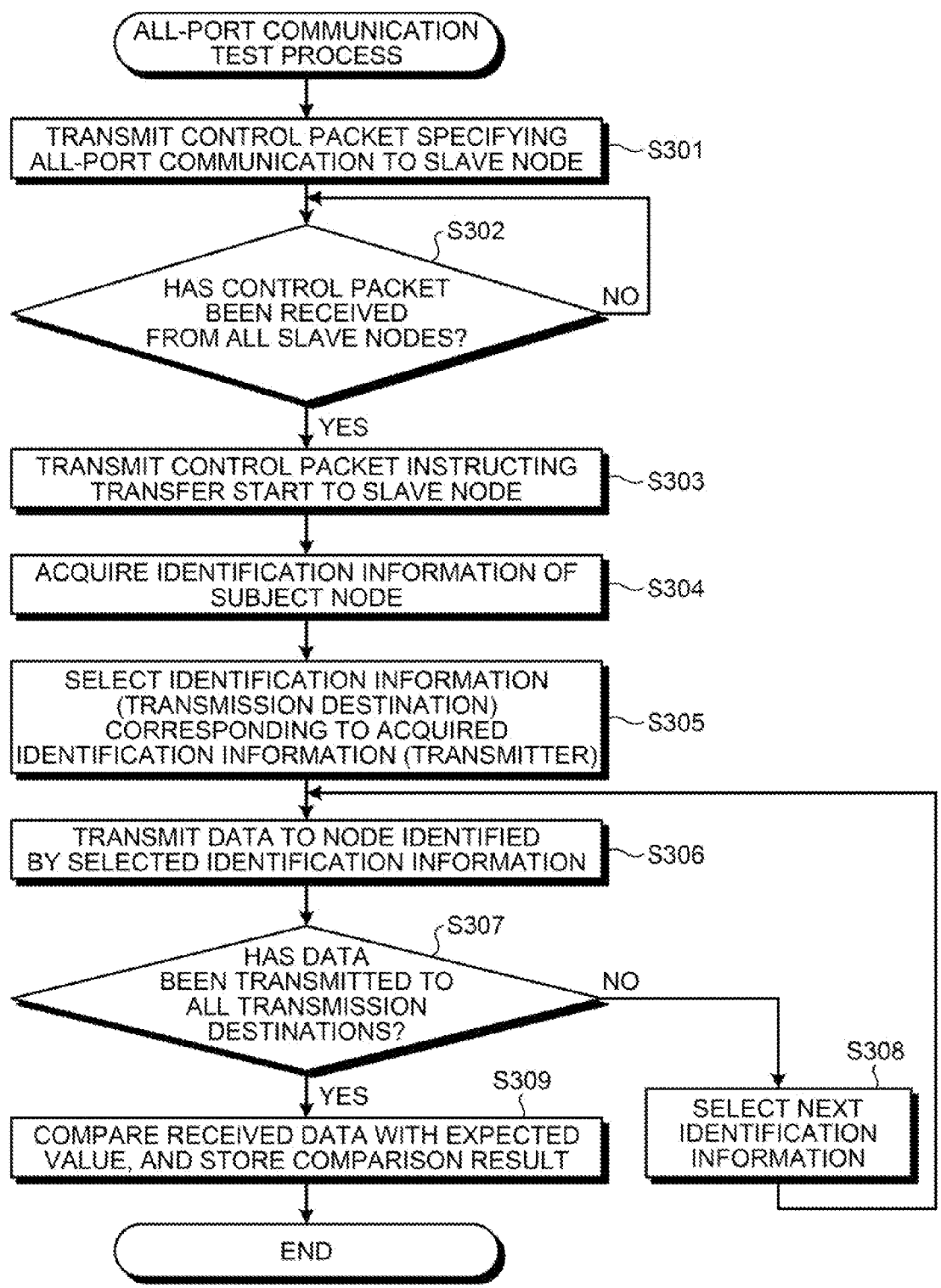
FIG. 9 is an example flowchart of an all-port communication test process performed by the node.

The all-port communication test process by the node 300 at Step 300 in FIG. 7 is explained with reference to FIG. 9. FIG. 9 is a flowchart of the all-port communication test process by the node 300.

As illustrated in FIG. 9, the test execution controlling unit 301 in the node 300 first transmits a control packet specifying the all-port communication to the nodes 400 to 600 as the slave nodes (Step S301). Then, upon receiving a control packet indicating that the test type has been recognized from all of the nodes 400 to 600 (YES at Step S302), the test execution controlling unit 301 transmits a control packet instructing transfer start to the nodes 400 to 600 (Step S303).

Then, the data exchanging unit 303 acquires identification information of the node 300 by the identification information acquiring unit 304 (Step S304), selects identification information (transmission destination) corresponding to the acquired identification information (transmitter) in the table stored in the table storage unit 302 (Step S305), and transmits data to a node identified by the selected identification information (Step S306). When not having transmitted data to all the transmission destinations in the table (NO at Step S307), the data exchanging unit 303 selects next identification information according to the order given to the transmission destinations in the table (Step S308), and the process returns to Step S306. Then, after transmitting data to all the transmission destinations (YES at Step S307), the data exchanging unit 303 compares the received data with the expected values, and stores the comparison result (Step S309), and the process ends. The data is received in any appropriate way, and is not illustrated in FIG. 9.

Figure 10:
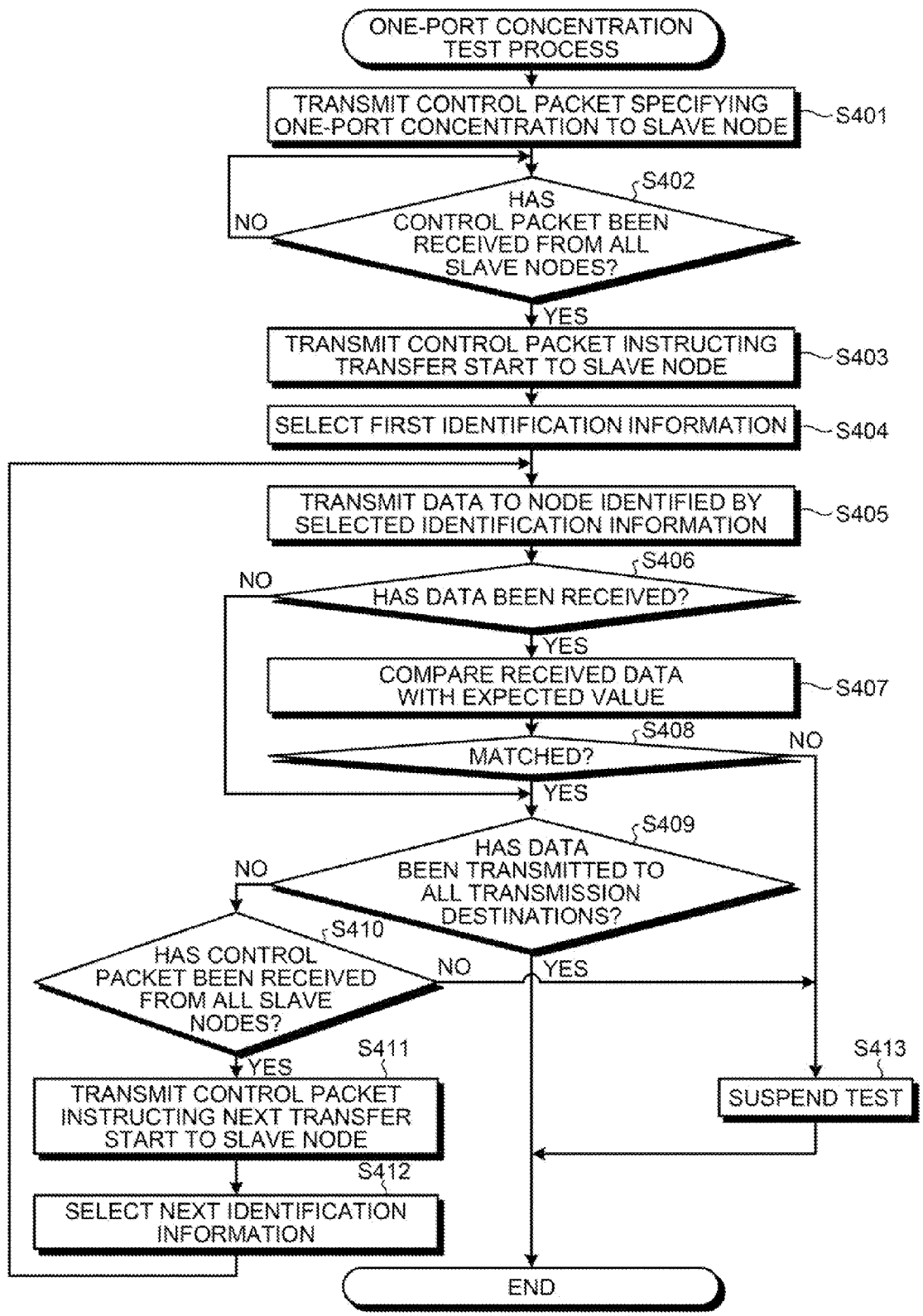
FIG. 10 is an example flowchart of a one-port concentration test process performed by the node.

The one-port concentration test process by the node 300 at Step S400 in FIG. 7 is explained with reference to FIG. 10. FIG. 10 is a flowchart of the one-port concentration test process performed by the node 300.

As illustrated in FIG. 10, the test execution controlling unit 301 in the node 300 transmits a control packet specifying the one-port concentration to the nodes 400 to 600 as the slave nodes (Step S401). Then, upon receiving a control packet indicating that the test type has been recognized from all of the nodes 400 to 600 (YES at Step S402), the test execution controlling unit 301 transmits a control packet instructing transfer start to the nodes 400 to 600 (Step S403).

Then, the data exchanging unit 303 selects the first identification information (transmission destination) in the table according to the order given to the identification information set as the transmission destinations in the table stored in the table storage unit 302 (Step S404), and transmits data to a node identified by the selected identification information (Step S405). Because in the one-port concentration test, the order of the transmission destinations set in the table for each node is completely the same, data is transmitted intensively to one node, and only upon receiving data (YES at Step 406), the data exchanging unit 303 compares the received data with the expected values (Step S407). When the received data and the expected values do not match with each other as a result of the comparison (NO at Step S408), the data exchanging unit 303 suspends the test (Step S413), and the process ends.

On the other hand, when the received data and the expected values match with each other as a result of the comparison by the data exchanging unit 303 (YES at Step S408) and data is not transmitted to all the transmission destinations in the table (NO at Step S409), or after data transmission by the data exchanging unit 303 (Step S405), when data is not received (Step S405) (NO at Step S406), and data is not transmitted to all the transmission destinations in the table (NO at Step S409), the test execution controlling unit 301 waits until it receives a control packet indicating the completion of data transfer preparation from all of the nodes 400 to 600 (Step S410). Then, upon receiving a control packet indicating the completion of data transfer preparation from all of the nodes 400 to 600 (YES at Step S410), the test execution controlling unit 301 transmits a control packet instructing next transfer start to the nodes 400 to 600 as the slave nodes (Step S411). On the other hand, when not having received a control packet indicating the completion of data transfer preparation from all of the nodes 400 to 600 (NO at Step S410), the test execution controlling unit 301 suspends the test (Step S413), and the process ends.

After the test execution controlling unit 301 transmits a control packet instructing next transfer start, the data exchanging unit 303 selects next identification information according to the order given to the identification information set as the transmission destinations in the table (Step S412), and the process returns to Step S405.

The process from Step S405 to Step S412 is repeated until data is transmitted to all the transmission destinations in the table. When the data exchanging unit 303 transmits data to all the transmission destinations (YES at Step S409), the test execution controlling unit 301 ends the one-port concentration test process. The data is received in any appropriate way, and is not explained in the processing flow in FIG. 10.

Figure 11:
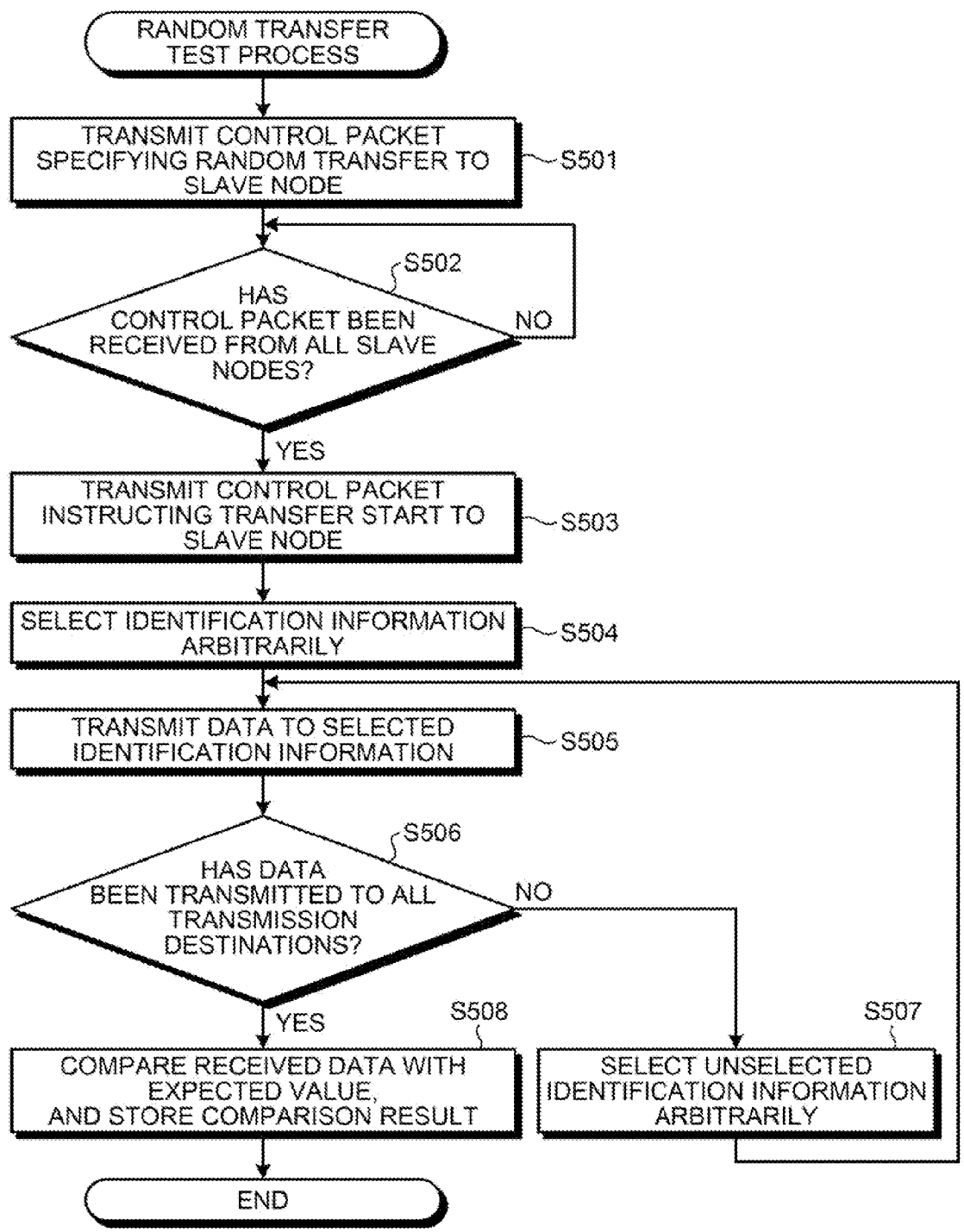
FIG. 11 is an example flowchart of a random transfer test process performed by the node.

The random transfer test process by the node 300 at Step S500 in FIG. 7 is explained with reference to FIG. 11. FIG. 11 is a flowchart of the random transfer test process performed by the node 300.

As illustrated in FIG. 11, the test execution controlling unit 301 in the node 300 first transmits a control packet specifying the random transfer to the nodes 400 to 600 as the slave nodes (Step S501). Then, upon receiving a control packet indicating that the test type has been recognized from all of the nodes 400 to 600 (YES at Step S502), the test execution controlling unit 301 transmits a control packet to instruct transfer start to the nodes 400 to 600 (Step S503).

Then, the data exchanging unit 303 arbitrarily selects identification information from the identification information set as the transmission destinations in the table stored in the table storage unit 302 (Step S504), and transmits data to a node identified by the selected identification information (Step S505). When not having transmitted data to all the transmission destinations in the table (NO at Step S506), the data exchanging unit 303 arbitrarily selects unselected identification information in the table (Step S507), and the process returns to Step S505. Then, after transmitting data to all the transmission destinations (YES at Step S506), the data exchanging unit 303 compares the received data with the expected values, stores the comparison result (Step S508), and ends the processing. The data is received in any appropriate way, and is not illustrated in FIG. 11.

Figure 12:
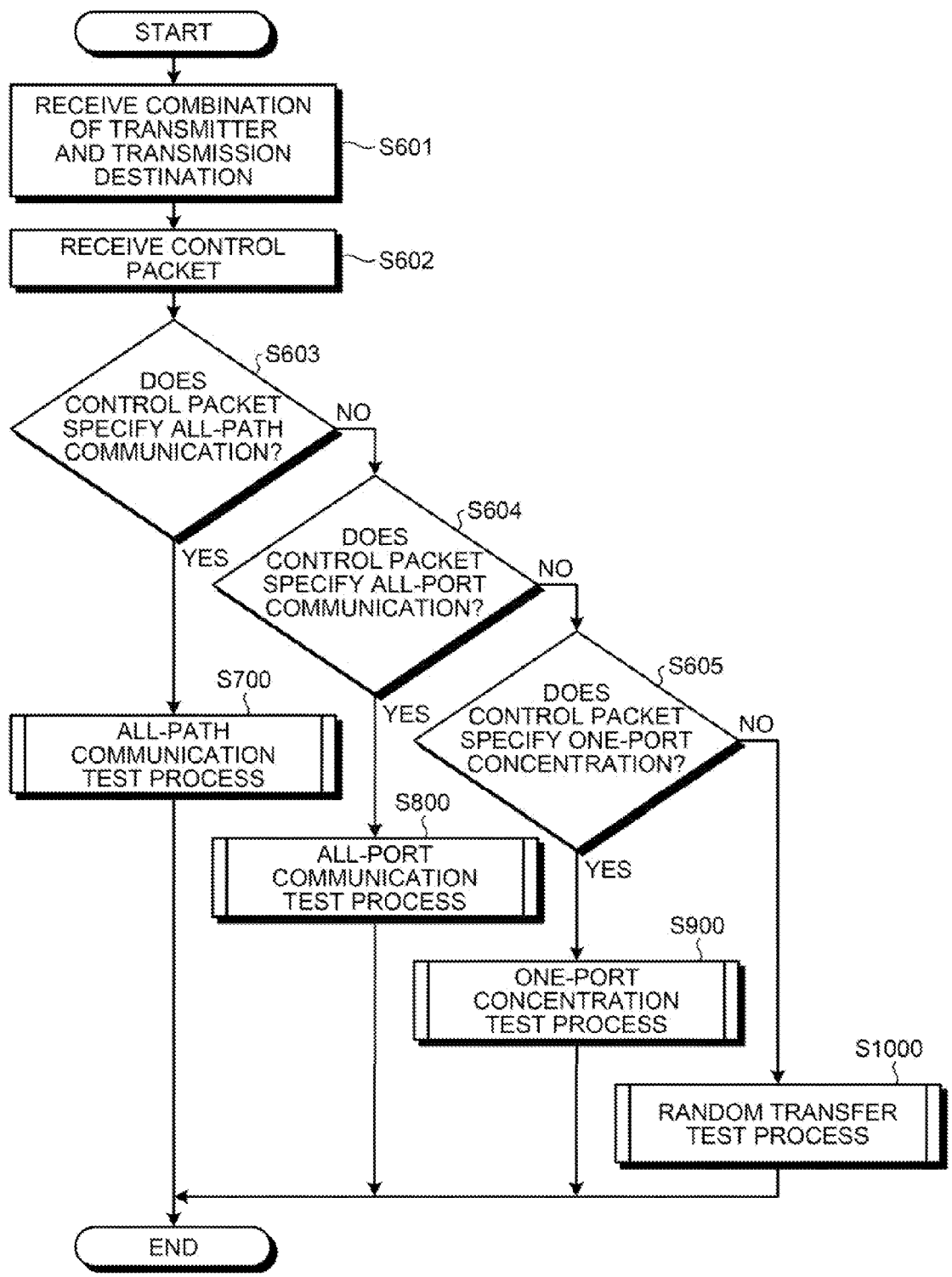
FIG. 12 is an example flowchart of the operation of a slave node.

A process flow performed by the node 400 as a slave node is explained. FIG. 12 is a flowchart of the operation of the node 400. The process flow illustrated in FIG. 12 is executed repeatedly while the network system is active.

As illustrated in FIG. 12, the data exchanging unit 401 in the node 400 receives a combination of a transmitter and a transmission destination from the node 300 as the master node (Step S601). Then, the data exchanging unit 401 receives a control packet specifying the test type from the node 300 (Step S602).

Then, when the control packet received from the node 300 specifies the all-path communication (YES at Step S603), the node 400 performs the all-path communication test process (Step S700). On the other hand, when the control packet received from the node 300 specifies the all-port communication test (NO at Step S603, and YES at Step S604), the node 400 performs the all-port communication test process (Step S800). On the other hand, when the control packet received from the node 300 specifies the one-port concentration test (NO at Step S603, NO at Step 604, and YES at Step S605), the node 400 performs the one-port concentration test process (Step S900). On the other hand, when the control packet received from the node 300 specifies the random transfer test (NO at Step S603, NO at Step S604, and NO at Step S605), the node 400 performs the random transfer test process (Step S1000). Then, the node 400 ends the process of S700, S800, S900, or S1000, and the process in FIG. 12 ends.

Figure 13:
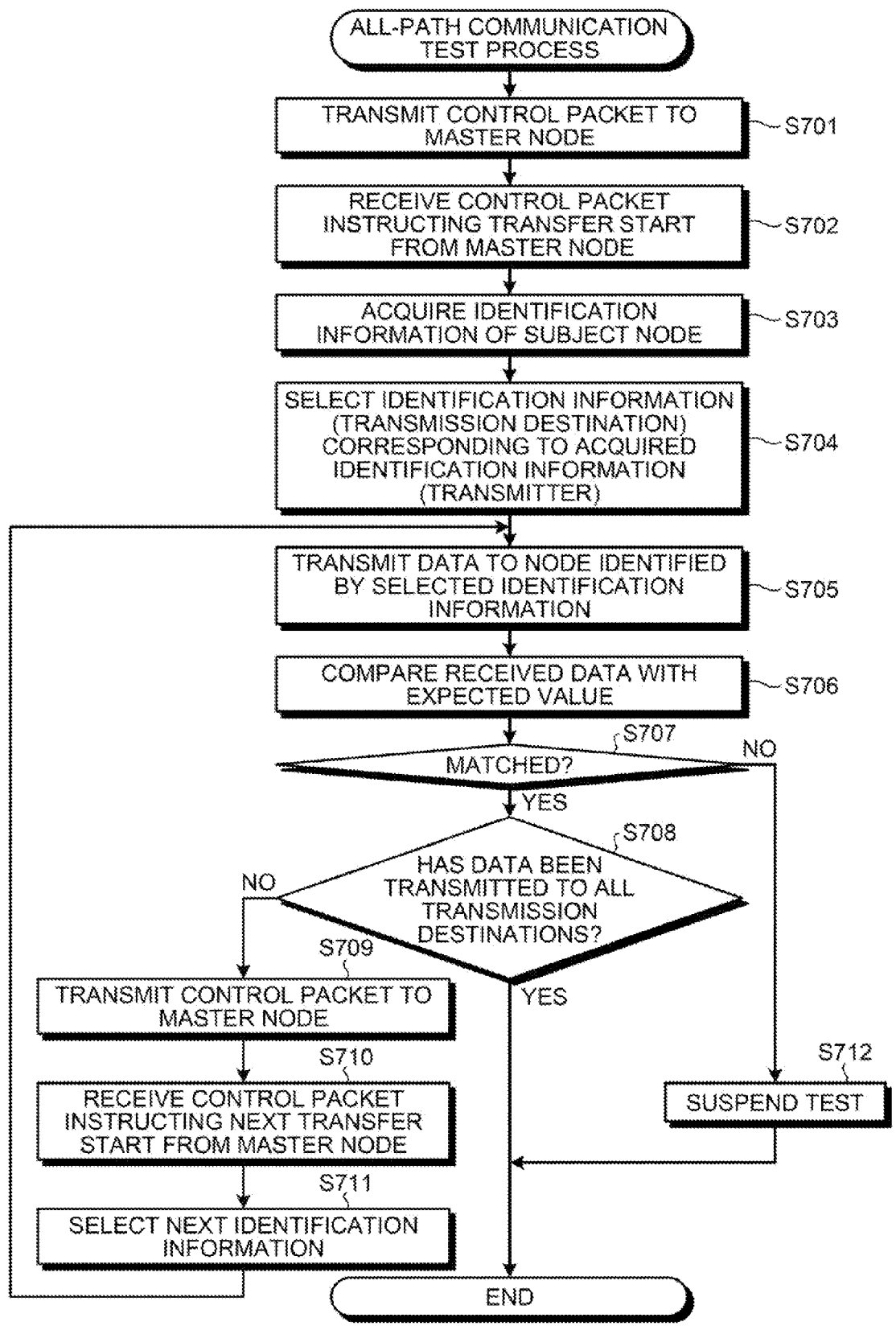
FIG. 13 is an example flowchart of an all-path communication test process performed by the node.

The all-path communication test process by the node 400 at Step S700 in FIG. 12 is explained with reference to FIG. 13. FIG. 13 is a flowchart of the all-path communication test process performed by the node 400.

As illustrated in FIG. 13, the data exchanging unit 401 in the node 400 first transmits a control packet indicating that the test type has been recognized to the node 300 as the master node (Step S701). Thereafter, the data exchanging unit 401 receives a control packet to instruct transfer start from the node 300 (Step S702).

Then, the data exchanging unit 401 acquires identification information of the node 400 by the identification information acquiring unit 403 (Step S703), selects identification information (transmission destination) corresponding to the acquired identification information (transmitter) in the table stored in the table storage unit 402 (Step S704), and transmits data to a node identified by the selected identification information (Step S705). Because in the case of the all-path communication test, data is transferred to the node 400 from the transfer switching unit 200 after data transmission, the data exchanging unit 401 compares the data received from the transfer switching unit 200 with the expected values retained by the node 400 itself (Step S706). When the received data and the expected values do not match with each other as a result of the comparison (NO at Step S707), the data exchanging unit 401 suspends the test (Step S712), and the process ends.

On the other hand, when the received data and the expected values match with each other as a result of comparison (YES at Step S707), and data is not transmitted to all the transmission destinations in the table (NO at Step S708), the data exchanging unit 401 transmits a control packet indicating the completion of data transfer preparation to the node 300 (Step S709). Thereafter, the data exchanging unit 401 receives a control packet to instruct next transfer start from the node 300 as the master node (Step S710), selects next identification information according to the order given to the identification information set as the transmission destinations in the table (Step S711), and the process returns to Step S705.

The process from Step S705 to Step S711 is repeated until data is transmitted to all the transmission destinations in the table. Having transmitted data to all the transmission destinations (YES at Step S708), the data exchanging unit 401 ends the all-path communication test process.

Figure 14:
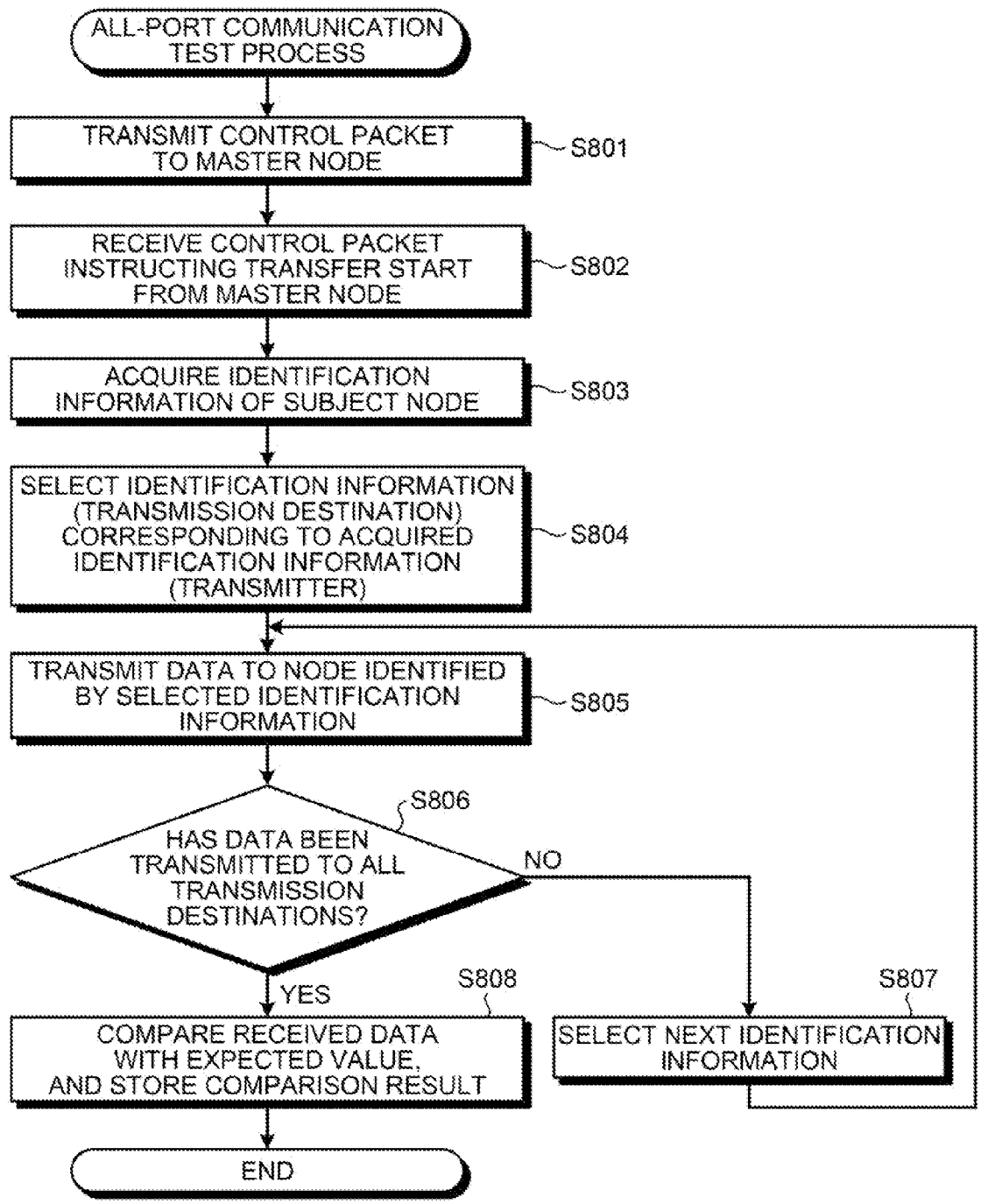
FIG. 14 is an example flowchart of an all-port communication test process performed by the node.

The all-port communication test process by the node 400 at Step S800 in FIG. 12 is explained with reference to FIG. 14. FIG. 14 is a flowchart of the all-port communication test process by the node 400.

As illustrated in FIG. 14, the data exchanging unit 401 in the node 400 first transmits a control packet indicating that the test type has been recognized to the node 300 as the master node (Step S801). Thereafter, the data exchanging unit 401 receives a control packet to instruct transfer start from the node 300 (Step S802).

Then, the data exchanging unit 401 acquires identification information of the node 400 by the identification information acquiring unit 403 (Step S803), selects identification information (transmission destination) corresponding to the acquired identification information (transmitter) in the table stored in the table storage unit 402 (Step S804), and transmits data to a node identified by the selected identification information (Step S805). When not having transmitted data to all the transmission destinations in the table, (NO at Step S806), the data exchanging unit 401 selects next identification information according to the order given to the identification information set as the transmission destination in the table (Step S807), and the process returns to Step S805. Then, upon transmitting data to all the transmission destinations (YES at Step S806), the data exchanging unit 401 compares the received data with the expected values, stores the comparison result (Step S808), and the process ends.

Figure 15:
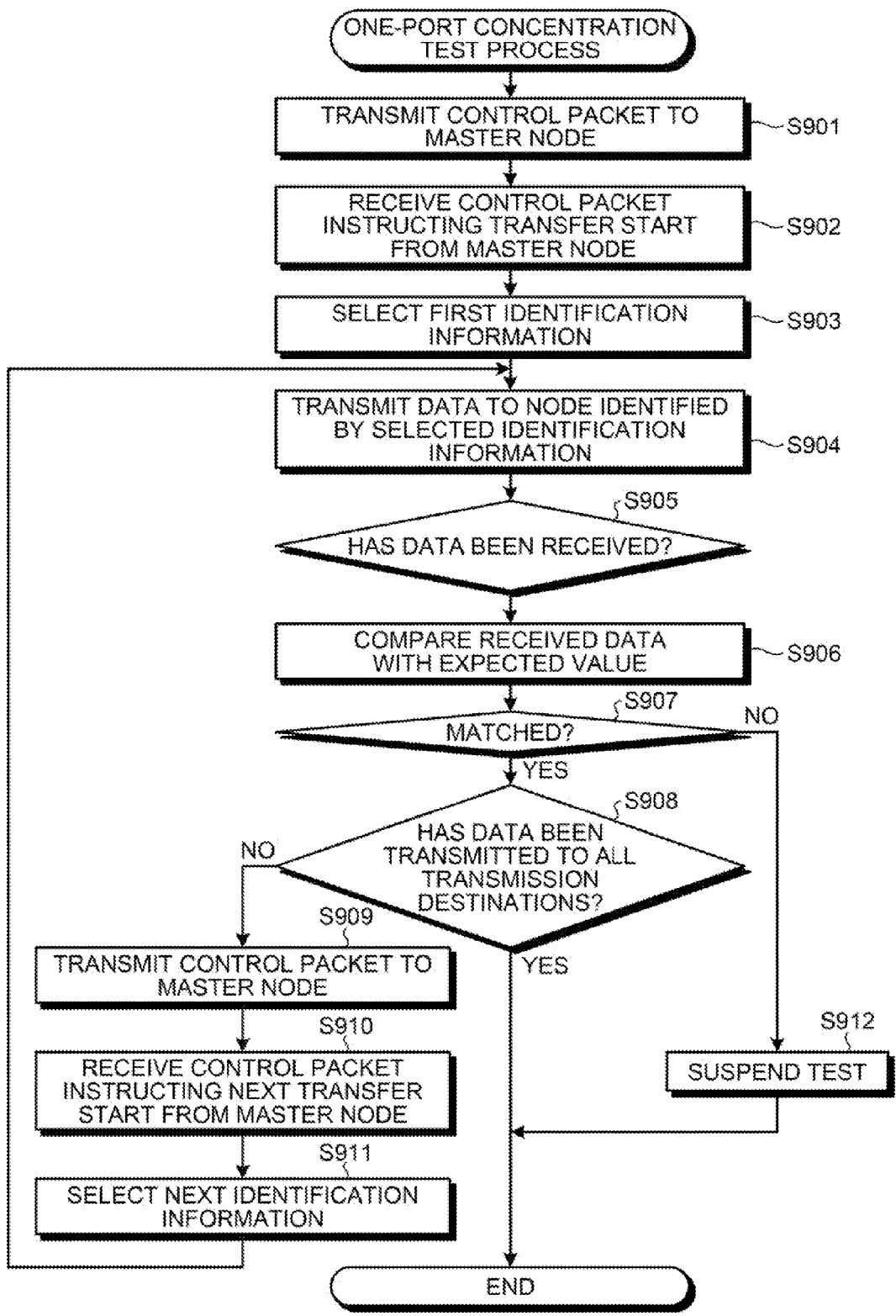
FIG. 15 is an example flowchart of a one-port concentration test process performed by the node.

The one-port concentration test process by the node 400 at Step S900 in FIG. 12 is explained with reference to FIG. 15. FIG. 15 is a flowchart of the one-port concentration test process performed by the node 400.

As illustrated in FIG. 15, the data exchanging unit 401 in the node 400 transmits a control packet indicating that the test type has been recognized to the node 300 as the master node (Step S901). Thereafter, the data exchanging unit 401 receives a control packet to instruct transfer start from the node 300 (Step S902).

Then, the data exchanging unit 401 selects the first identification information (transmission destination) in the table according to the order given to the identification information set as the transmission destinations in the table stored in the table storage unit 402 (Step S903), and transmits data to a node identified by the selected identification information (Step S904). Because in the one-port concentration test, the order of the transmission destinations set in the table for each node is completely the same, data is transmitted intensively to one node, and only upon receiving data (YES at Step S905), the data exchanging unit 401 compares the received data with the expected values (Step S906). When the received data and the expected values do not match with each other as a result of the comparison (NO at Step S907), the data exchanging unit 401 suspends the test (Step S912), and the process ends.

On the other hand, when the received data and the expected values match with each other as a result of the comparison (YES at Step 907) and data is not transmitted to all the transmission destinations in the table (NO at Step S908), or when after the data transmission (Step S904), data is not received (NO at Step S905) and data is not transmitted to all the transmission destinations in the table (NO at Step S908), the data exchanging unit 401 transmits a control packet indicating the completion of data transfer preparation to the node 300 (Step S909). Thereafter, the data exchanging unit 401 receives a control packet to instruct transfer start from the node 300 (Step S910). Having received the control packet, the data exchanging unit 401 selects next identification information according to the order given to the identification information set as the transmission destination in the table (Step S911), and the process returns to Step S904.

The process from Step S904 to Step S911 is repeated until data is transmitted to all the transmission destinations in the table. Having transmitted data to all the transmission destinations (YES at Step S908), the data exchanging unit 401 ends the one-port concentration test process.

Figure 16:
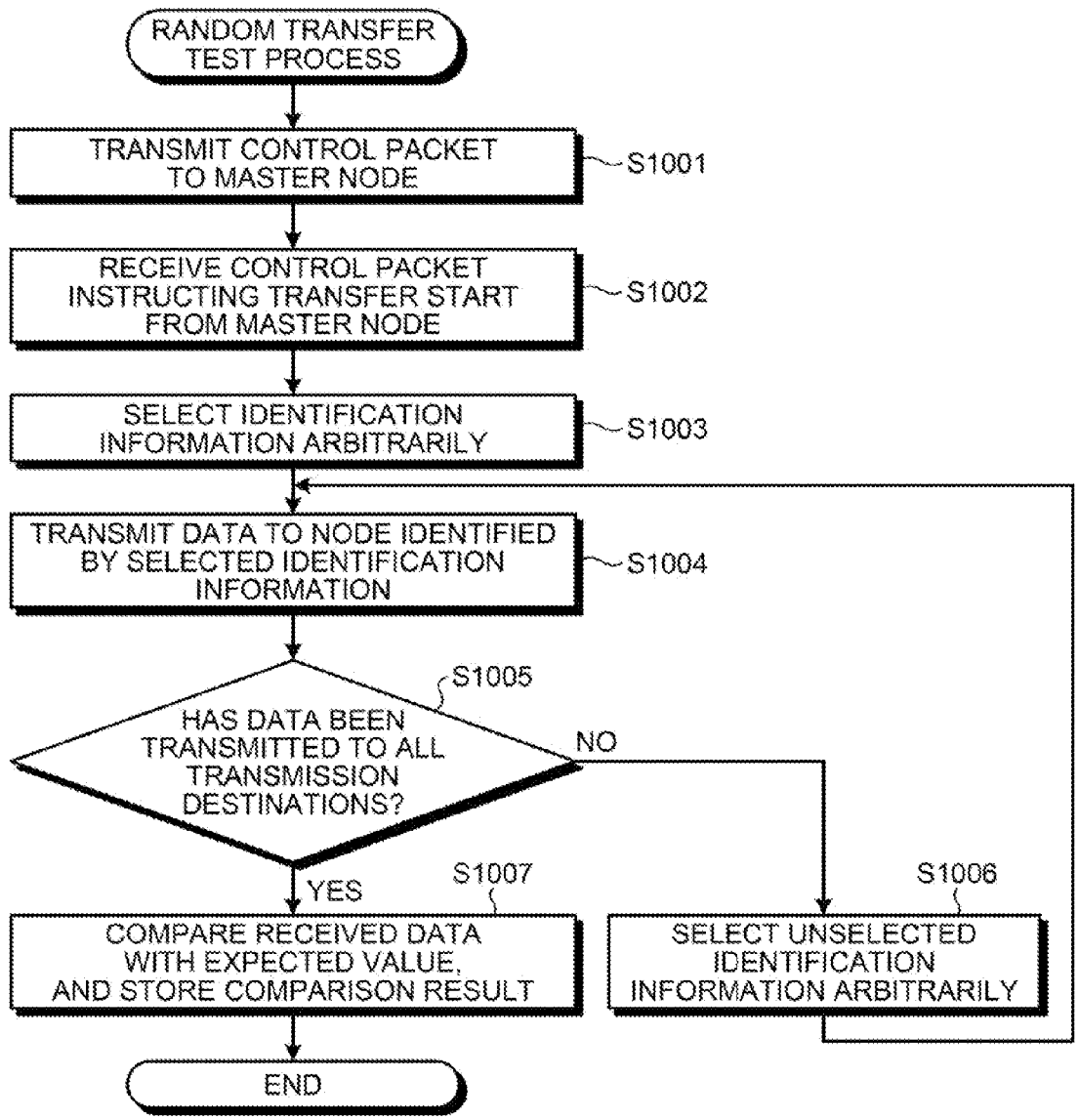
FIG. 16 is an example flowchart of a random transfer test process performed by the node.

The random transfer test process by the node 400 at Step S1000 in FIG. 12 is explained with reference to FIG. 16. FIG. 16 is a flowchart of the random transfer test process by the node 400.

As illustrated in FIG. 16, the data exchanging unit 401 in the node 400 first transmits a control packet indicating that the test type has been recognized to the node 300 as the master node (Step S1001). Thereafter, the data exchanging unit 401 receives a control packet to instruct transfer start from the node 300 (Step S1002).

Then, the data exchanging unit 401 selects arbitrary information from the identification information set as the transmission destinations in the table stored in the table storage unit 402 (Step S1003), and transmits data to a node identified by the selected identification information (Step S1004). When not having transmitted data to all the transmission destinations in the table (NO at Step S1005), the data exchanging unit 401 arbitrarily selects unselected identification information in the table (Step S1006), and the process returns to Step S1004. Then, after having transmitted data to all the transmission destinations (YES at Step S1005), the data exchanging unit 401 compares the received data with the expected values, stores the comparison result (Step S1007), and the process ends.

As explained above, in the network system 100 of the embodiment, the node 300 as the master node controls the order and the timing of transmitting data to all the nodes from each node including the node 300. In this way, it becomes unnecessary to store in each node a path list for deciding a transmission destination as fixed data, and thus it becomes possible to test a system by making each node execute a single computer program. Furthermore, because the node 300 only has to acquire identification information of each node again even when a node is added to or removed from the network system 100, it becomes possible to eliminate the recreation of four path lists for the nodes, for example.

The configuration of the node 300 and the node 400 according to the embodiment illustrated in FIGS. 2 and 6 may be changed in various ways in a range not deviating from the gist of the present invention. For example, the same function as the node 300 can be realized as software. In other words, a computer program (hereinafter, "system test program" may be executed on a computer by a central processing unit (CPU) to implement the test execution controlling unit 301, the data exchanging unit 303, and the identification information acquiring unit 304 of the node 300. The following illustrates an example of such a computer that executes the system test program implementing the test execution controlling unit 301, the data exchanging unit 303, and the identification information acquiring unit 304 of the node 300. The system test program also implements the data exchanging unit 401, and the identification information acquiring unit 403 of the node 400.

Figure 17:
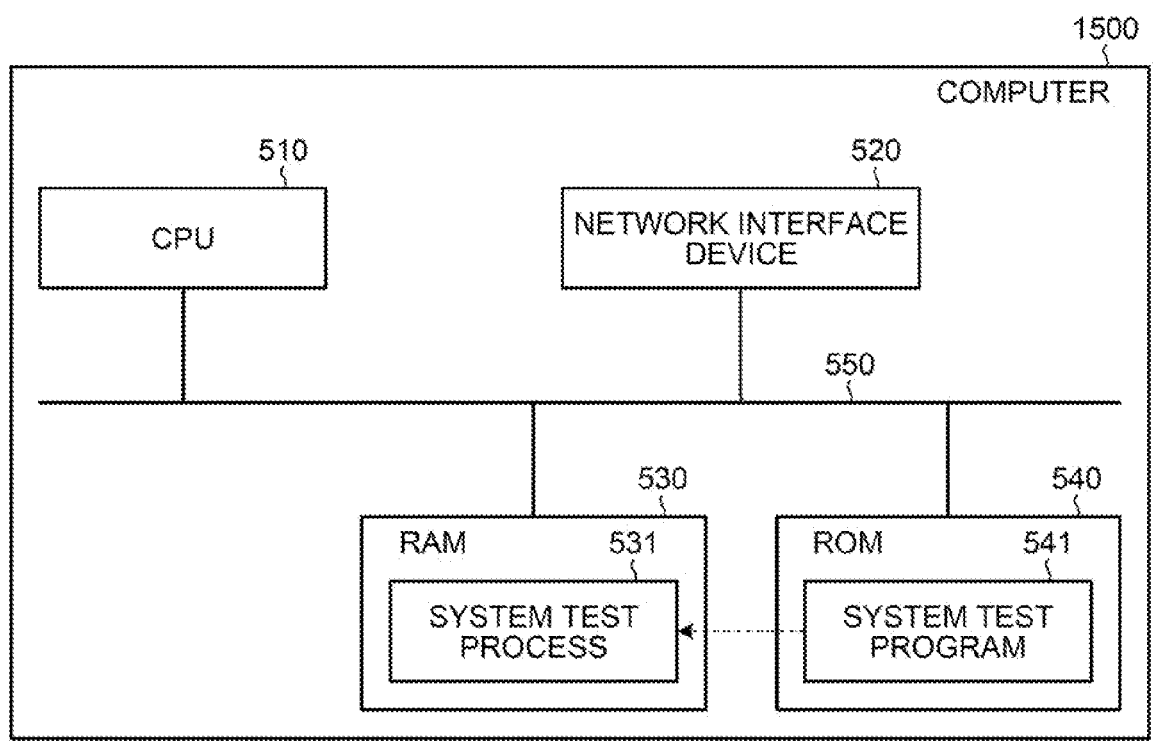
FIG. 17 is an example schematic diagram of a computer that executes a system test program.

FIG. 17 illustrates a computer 1500 that executes a system test program 541. The computer 1500 is configured by connecting a CPU 510 that executes various types of processing, a network interface device 520 that exchanges data with another computer through a network, a random access memory (RAM) 530 that temporarily stores various types of information, and a read-only memory (ROM) 540, which are connecting with a bus 550.

The ROM 540 stores therein the system test program 541 having a function equivalent to those of the test execution controlling unit 301, the data exchanging unit 303, and the identification information acquiring unit 304 illustrated in FIG. 2.

When the CPU 510 reads out the system test program 541 from the ROM 540, and loads the program into the RAM 530, the system test program 541 performs a system test process 531. The system test process 531 appropriately loads information or the like generated in various types of processing to an area on the RAM 530 allocated to the system test process 531, and executes various types of data processing based on the loaded data or the like.

The system test program 541 needs not be stored in the RAM 540, but may be stored in a storage medium such as a memory card, and executed by being read out by the computer 1500. The program may be stored in another computer (or server) or the like connected to the computer 1500 through a public line, the Internet, a local area network (LAN), a wide area network (WAN), and the like, and executed by being read out by the computer 1500.

Although, in the embodiment, the test execution controlling unit 301 decides a transmission destination according to the ranking given to the identification information set as the transmission destinations in the table, it is not so limited. A table of identification information of transmitters, and a table of identification information of transmission destinations may be created separately, and a transmission destination may be decided by changing association of the tables. Specific operations performed by each node in this case are explained with reference to FIGS. 18 to 21.

As illustrated in FIG. 18, upon acquiring identification information of the nodes 300 to 600 connected to the transfer switching unit 200 including the node 300 itself, the test execution controlling unit 301 in the node 300 creates a table in which identification information is set as a transmitter, and a table in which identification information is set as a transmission destination. Then, the test execution controlling unit 301 stores the tables in the table storage unit 302, and transmits the tables to the slave nodes. Specific operation performed by the data exchanging unit 303 in the node 300 and the data exchanging unit 401 in the node 400 when such tables are created is explained for each test type in the order of the all-path communication, the all-port communication, the one-port concentration, and the random transfer.

The all-path communication test and the all-port communication test are explained. Having been instructed to start data transfer by the test execution controlling unit 301, the data exchanging unit 303 in the node 300 instructs the identification information acquiring unit 304 to acquire identification information of the node 300 as in the above-described embodiment, and receives identification information of the node 300. Then, the data exchanging unit 303 refers to each table stored in the table storage unit 302 as illustrated in FIG. 19, and for example, upon receiving identification information "0", selects identification information "0" corresponding to the identification information "0" (identification information of the node 300) in the table in which the transmitters are set, among the identification information in the table in which the transmission destinations are set. The processing after the selection is the same as previously described in the embodiment, and is not explained here.

When next identification information is selected, the data exchanging unit 303 shifts the identification information in the table in which the transmission destinations are set as illustrated in FIG. 18 to change association of the identification information of each table, and select identification information "1" corresponding to the identification information "0" (identification information of the node 300) in the table in which the transmitters are set, in the table in which the transmission destinations are set. Thereafter, the data exchanging unit 303 changes association of the identification information as illustrated in FIG. 18, and selects all the identification information. The process performed by the data exchanging units of the other nodes is the same as that of the data exchanging unit 303, and is not explained here.

Figure 20:
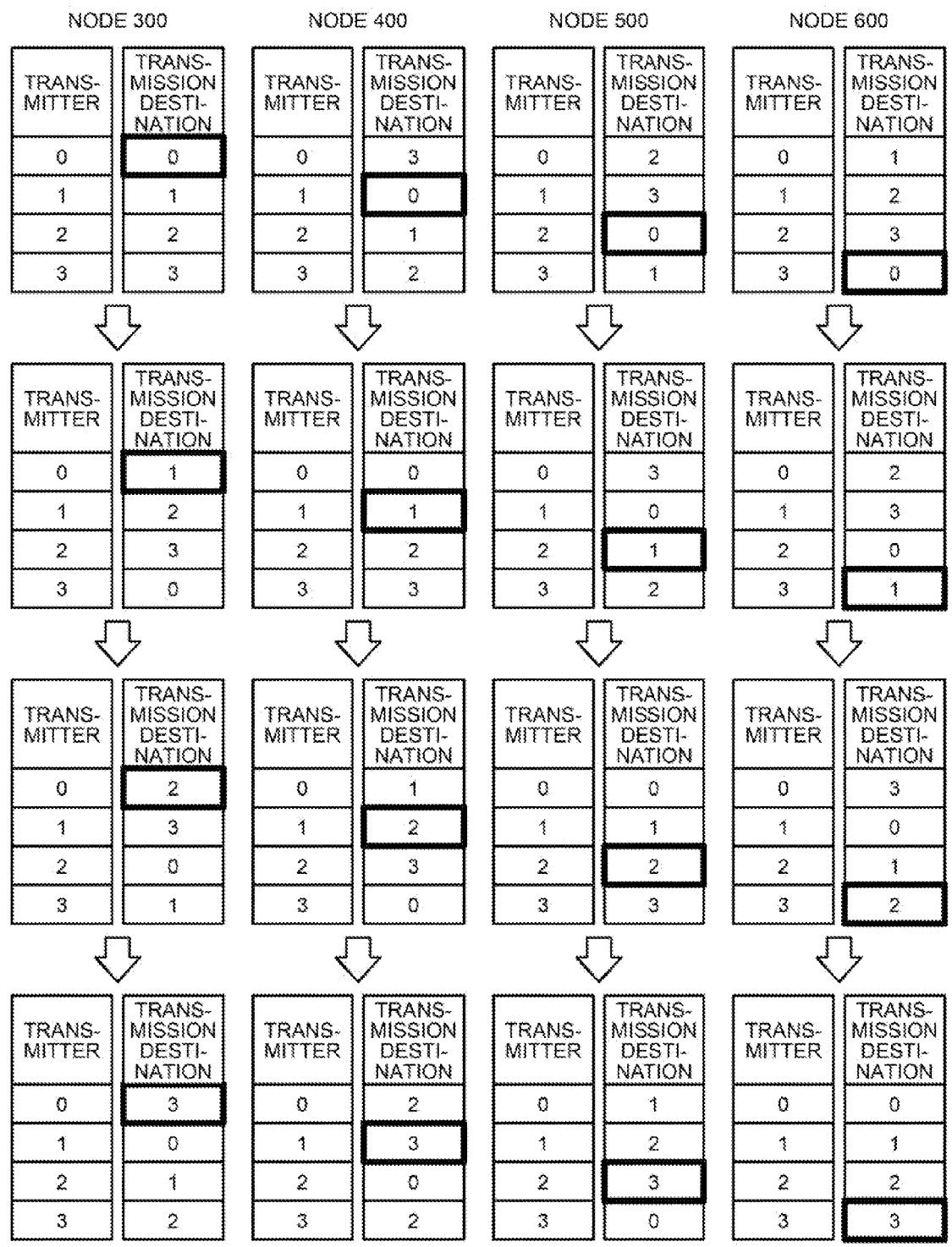
FIG. 20 is an example of tables for explaining selection of identification information of transmission destinations of the one-port concentration test.

The one-port concentration test is explained. Having been instructed to start data transfer by the test execution controlling unit 301, the data exchanging unit in each node acquires identification information of the subject node. Then, as illustrated in FIG. 20, the data exchanging unit 303 in the node 300 refers to the tables stored in the table storage unit 302 and, for example, upon receiving identification information "0", changes the association of the identification information until the identification information "0" in the table in which the transmission destinations are set corresponds to the identification information "0" (the identification information of the subject node) in the table in which the transmitters are set. In FIG. 20, the association of the identification information needs not be changed, and at the start of the first data transfer, the tables are kept as they are stored in the table storage unit 302.

On the other hand, as illustrated in FIG. 20, the data exchanging unit 401 in the node 400 refers to the tables stored in the table storage unit 402 and, for example, upon receiving identification information "1", changes the association of the identification information until the identification information "0" in the table in which the transmission destinations are set corresponds to the identification information "1" (identification information of the subject node) in the table in which the transmitters are set. In data exchange in the node 500 and the node 600 as well, the same process of changing the association is performed for each table stored in the table storage units.

At the time of selecting identification information afterwards, the data exchanging unit of each node shifts the identification information in the table in which the transmission destinations are set as illustrated in FIG. 20 as in the all-path communication test and the all-port communication test, and thereby changes the association of the identification information in each table, and selects identification information corresponding to the identification information of the subject node in the table in which the transmitters are set, among the identification information in the table in which the transmission destinations are set.

Figure 21:
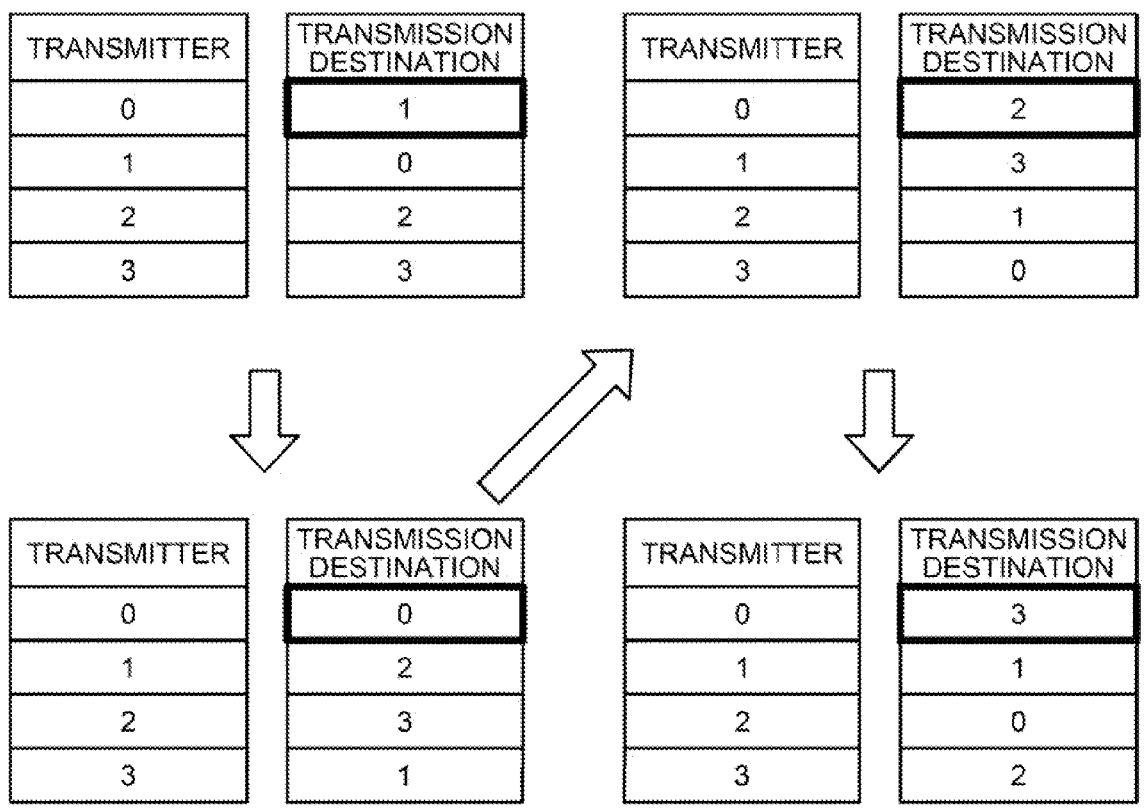
FIG. 21 is an example of tables for explaining selection of identification information of transmission destinations of the random transfer test.

The random transfer test is explained. As in the above-described embodiment, upon being instructed to start data transfer by the test execution controlling unit 301, the data exchanging unit 303 in the node 300 instructs the identification information acquiring unit 304 to acquire identification information of the node 300, and receives the identification information of the node 300. Then, as illustrated in FIG. 21, the data exchanging unit 303 shuffles identification information in the table that is stored in the table storage unit 302 and in which the transmission destinations are set. Then, the data exchanging unit 303 refers to the tables stored in the table storage unit 302 and, for example, upon receiving identification information "0", selects identification information "1" corresponding to the identification information "0" (identification information of the subject node) in the table in which the transmitters are set, among the identification information in the table in which the transmission destinations are set.

At the timing of selecting next identification information, as in the all-path communication test and the previous port communication test, as illustrated in FIG. 21, the data exchanging unit 303 shifts the identification information in the table in which the transmission destinations are set, and thereby changes the association of the identification information in the tables, and selects identification information "0"

corresponding to the identification information "0" (identification information of the node 300) in the table in which the transmitters are set, in the table in which the transmission destinations are set. Thereafter, as illustrated in FIG. 21, the data exchanging unit 303 changes the association of the identification information, and selects all the identification information. The process performed by the data exchanging units in the other nodes is the same as that of the data exchanging unit 303, and is not explained here.

According to an aspect of the embodiment, a test of a system can be performed by making each node execute a single computer program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A network system comprising:
    a data transfer device that transfers data; and
    a plurality of information processing apparatuses connected to the data transfer device, the information processing apparatuses including a master information processing apparatus and a slave information processing apparatus, wherein
    the master information processing apparatus includes
        a controlling unit that controls an order and a timing in and at which each of the information processing apparatuses transmits data to each of the information processing apparatuses by transmitting to the slave information processing apparatus information of a combination of a transmission destination and a transmitter based on identification information of the information processing apparatuses, and controls each of the information processing apparatuses to execute a same program to perform a test, and
    each of the information processing apparatuses includes
        a transmitting unit that transmits the data to each of the information processing apparatuses in the order and at the timing controlled by the controlling unit based on received information of the combination of a transmission destination and a transmitter, wherein
    the controlling unit transmits to the slave information processing apparatus a combination of a transmission destination and a transmitter obtained by arbitrarily associating each piece of first identification information of the information processing apparatuses with each piece of second identification information of the information processing apparatuses to which a ranking is given according to a test type, the test type being one of an all path communication, all port communication, one-port communication and random transfer.

2. The network system according to claim 1, wherein
    the controlling unit controls the timing every time each of the information processing apparatuses transmits data,
    the transmitting unit of the master information processing apparatus selects identification information of a transmission destination associated with identification information of a transmitter that matches identification information of the master information processing apparatus according to the test type, transmits the data to an information processing apparatus identified by the identification information selected at the timing controlled by the controlling unit, and thereafter selects identification information according to the ranking to sequentially transmit the data to an information processing apparatus identified by the identification information selected at the timing controlled by the controlling unit, and
    the transmitting unit of the slave information processing apparatus selects identification information of a transmission destination associated with identification information of a transmitter that matches identification information of the slave information processing apparatus according to the test type, transmits the data to an information processing apparatus identified by the identification information selected at the timing controlled by the controlling unit, and thereafter selects identification information according to the ranking to sequentially transmit the data to an information processing apparatus identified by the identification information selected at the timing controlled by the controlling unit.

3. The network system according to claim 1, wherein
    the controlling unit controls the timing when each of the information processing apparatuses transmits data for first time,
    the transmitting unit of the master information processing apparatus selects identification information of a transmission destination associated with identification information of a transmitter that matches identification information of the master information processing apparatus according to the test type, transmits the data to an information processing apparatus identified by the identification information selected at the timing controlled by the controlling unit, and thereafter selects identification information according to the ranking to sequentially transmit the data to an information processing apparatus identified by the identification information selected at the timing controlled by the controlling unit, and
    the transmitting unit of the slave information processing apparatus selects identification information of a transmission destination associated with identification information of a transmitter that matches identification information of the slave information processing apparatus according to the test type, transmits the data to an information processing apparatus identified by the identification information selected at the timing controlled by the controlling unit, and thereafter selects identification information according to the ranking to sequentially transmit the data to an information processing apparatus identified by the identification information selected at the timing controlled by the controlling unit.

4. The network system according to claim 1, wherein the controlling unit of the master information processing apparatus transmits pieces of identification information of the information processing apparatuses to the slave information processing apparatus according to the test type, and controls the timing when each of the information processing apparatuses transmits data for first time,
    the transmitting unit of the master information processing apparatus and the transmitting unit of the slave information processing apparatus select identification information arbitrarily from the pieces of identification information of the information processing apparatuses according to the test type, transmit the data to an information processing apparatus identified by the identification information selected at the timing controlled by the controlling unit, and thereafter select identification information of information processing apparatuses to which the data is yet to be transmitted to sequentially transmit the data to the information processing apparatuses identified by the identification information selected.

5. The network system according to claim 4, wherein the transmitting unit of the master information processing apparatus and the transmitting unit of the slave information processing apparatus divide the data to transmit the data for a plurality of times.

6. The network system according to claim 1, wherein
the controlling unit of the master information processing apparatus transmits pieces of identification information of the information processing apparatuses, and controls the timing every time each of the information processing apparatuses transmits data, and
the transmitting unit of the master information processing apparatus and the transmitting unit of the slave information processing apparatus select identification information based on the ranking from the pieces of identification information of the information processing apparatuses according to the test type, and sequentially transmit the data to an information processing apparatus identified by the identification information selected at the timing controlled by the controlling unit.

7. A computer readable medium storing therein code that, when executed, causes a computer, in a network system including a data transfer device that transfers data and a plurality of information processing apparatuses connected to the data transfer device, to implement:
a master information processing apparatus being one of the information processing apparatuses including
a controlling unit that controls an order and a timing in and at which the information processing apparatuses including the master information processing apparatus transmit data to each of the information processing apparatuses by transmitting to the information processing apparatuses information of a combination of a transmission destination and a transmitter based on identification information of the information processing apparatuses, and controls each of the information processing apparatuses to execute a same program to perform a test, and
a transmitting unit that transmits the data to each of the information processing apparatuses in the order and at the timing controlled by the controlling unit based on the information of the combination of a transmission destination and a transmitter, wherein
the controlling unit transmits to a slave information processing apparatus a combination of a transmission destination and a transmitter obtained by arbitrarily associating each piece of first identification information of the information processing apparatuses with each piece of second identification information of the information processing apparatuses to which a ranking is given according to a test type, the test type being one of an all path communication, all port communication, one-port communication and random transfer.

8. An information processing apparatus connected to other information processing apparatuses through a network, the information processing apparatus comprising:
a controlling unit that creates, with respect to the other information processing apparatuses and the information processing apparatus connected through the network, a table of a list of information processing apparatuses as data transmitters and a list of information processing apparatuses as transmission destinations of data, in which the data transmitters are associated with the transmission destinations, respectively, based on identification information of the information processing apparatuses, the table being information of a combination of a transmission destination and a transmitter;
a storage unit that stores therein the table created by the controlling unit; and
a transmitting unit that transmits to the other information processing apparatuses the table and an instruction to transfer data based on information set in the table, to cause the information processing apparatus itself and each of the other information processing apparatuses to execute a same program to perform a test having a test type of at least one of an all path communication, all port communication, one-port communication and random transfer, and transfers data to an information processing apparatus associated as a transmission destination with the information processing apparatus in the table.

9. The information processing apparatus according to claim 8, further comprising a comparing unit that compares data received from the information processing apparatus as the transmission destination with a comparison value stored in advance in the information processing apparatus correspondingly to data transfer to the information processing apparatus as the transmission destination.

10. The information processing apparatus according to claim 8, wherein
the controlling unit changes association between the information processing apparatuses as data transmitters and the information processing apparatuses as transmission destinations set in the table by a predetermined procedure after data transfer to the information processing apparatus as the transmission destination, and
the transmitting unit transfers data to an information processing apparatus associated with the information processing apparatus as a transmission destination in the table in which the association is changed.

11. An information processing apparatus connected to another information processing apparatus through a network, the information processing apparatus comprising:
a storage unit that stores therein a table of a list of information processing apparatuses as data transmitters and a list of information processing apparatuses as transmission destinations of data, in which the data transmitters are associated with the transmission destinations, respectively, the table being information of a combination of a transmission destination and a transmitter and received from the other information processing apparatus which creates the table based on identification information of each information processing apparatus;
a receiving unit that receives a data transfer instruction from the other information processing apparatus;
a controlling unit that refers to the table according to the data transfer instruction, identifies an information processing apparatus associated as a transmission destination with the information processing apparatus in the table, and controls the information processing apparatus associated as the transmission destination to execute a same program as a program executed by the other information processing apparatus to perform a test having a test type of at least one of an all path communication, all port communication, one-port communication and random transfer; and
a transmitting unit that transfers data to the information processing apparatus identified as the transmission destination by the controlling unit.

12. The information processing apparatus according to claim 11, wherein the controlling unit changes association between the information processing apparatuses as data transmitters and the information processing apparatuses as transmission destinations set in the table by a predetermined procedure after data transfer to the information processing apparatus as the transmission destination, and identifies an information processing apparatus associated with the information processing apparatus in the table in which the association is changed as a transmission destination.

13. A computer readable medium storing therein code that, when executed, causes a computer, in a network system including a data transfer device that transfers data and a plurality of information processing apparatuses connected to the data transfer device, to implement:

a slave information processing apparatus which is one of the plurality of information processing apparatus and which is not a master information processing apparatus, the slave information processing apparatus including a transmitting unit that transmits data to each of the information processing apparatuses in an order and at a timing controlled by a control unit of the master information processing apparatus based on information of combination of a transmission destination and a transmitter transmitted from and created by the master information processing apparatus based on identification information of each information processing apparatus, the slave information processing apparatus executing a same program as other information processing apparatuses to perform a test having a test type of at least one of an all path communication, all port communication, one-port communication and random transfer.

* * * * *